United States Patent
Hu et al.

(10) Patent No.: US 10,517,452 B2
(45) Date of Patent: *Dec. 31, 2019

(54) CYCLONIC SEPARATING DEVICE FOR UPRIGHT VACUUM CLEANER AND UPRIGHT VACUUM CLEANER HAVING THE SAME

(71) Applicant: JIANGSU MIDEA CLEANING APPLIANCES CO., LTD., Suzhou (CN)

(72) Inventors: Wei Hu, Suzhou (CN); Hui Zou, Suzhou (CN); Xiahu Xiao, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 198 days.

This patent is subject to a terminal disclaimer.

(21) Appl. No.: 15/638,119

(22) Filed: Jun. 29, 2017

(65) Prior Publication Data

US 2017/0296015 A1     Oct. 19, 2017

Related U.S. Application Data

(63) Continuation of application No. PCT/CN2016/075615, filed on Mar. 4, 2016.

(30) Foreign Application Priority Data

Dec. 10, 2015   (CN) .......................... 2015 1 0917466
Dec. 10, 2015   (CN) .......................... 2015 1 0917497
(Continued)

(51) Int. Cl.
*A47L 9/04*       (2006.01)
*F16H 7/08*       (2006.01)
(Continued)

(52) U.S. Cl.
CPC ............... *A47L 9/0444* (2013.01); *A47L 5/28* (2013.01); *A47L 5/30* (2013.01); *A47L 9/04* (2013.01);
(Continued)

(58) Field of Classification Search
CPC .... A47L 9/0455; A47L 9/0405; A47L 9/0427; A47L 11/204; F16D 2023/126; F16H 7/0827
(Continued)

(56) References Cited

U.S. PATENT DOCUMENTS 2,250,282 A * 7/1941 Swann ...................... A47L 5/32
                                                        15/332
2,601,698 A * 7/1952 Humphrey ................ A47L 5/34
                                                        15/390
(Continued)

FOREIGN PATENT DOCUMENTS

CN   1355004 A    6/2002
CN   1667197 A    9/2005
(Continued)

OTHER PUBLICATIONS

Jiangsu Midea Electrical Appliance Co. Ltd., First Office Action, CN201510917466.2 dated Jun. 28, 2017, 10 pgs.
(Continued)

*Primary Examiner* — Bryan R Muller
(74) *Attorney, Agent, or Firm* — Morgan, Lewis & Bockius LLP

(57) ABSTRACT

A cyclonic separating device for an upright vacuum cleaner and an upright vacuum cleaner with the same are disclosed. The cyclonic separating device includes a dirt cup, a filter and a cyclonic cone assembly. The filter is disposed in the dirt cup and includes a filter inlet and a filter outlet communicating between the filter inlet and an air outlet. The
(Continued)

cyclonic cone assembly includes a cyclone cylinder and a cyclonic guide, in which a first end of the cyclone cylinder is communicated with an air inlet, and the cyclonic guide is fitted in a second end of the cyclone cylinder and is detachably fitted over the filter to spirally guide dirty air introduced into the cyclone cylinder from the air inlet to the filter inlet.

19 Claims, 14 Drawing Sheets

(30) Foreign Application Priority Data

| Date | | |
|---|---|---|
| Dec. 10, 2015 | (CN) | 2015 1 0917498 |
| Dec. 10, 2015 | (CN) | 2015 1 0917499 |
| Dec. 10, 2015 | (CN) | 2015 1 0917528 |
| Dec. 10, 2015 | (CN) | 2015 1 0917653 |
| Dec. 10, 2015 | (CN) | 2015 1 0918541 |
| Dec. 10, 2015 | (CN) | 2015 1 0918544 |
| Dec. 10, 2015 | (CN) | 2015 1 0918580 |
| Dec. 10, 2015 | (CN) | 2015 1 0918662 |
| Dec. 10, 2015 | (CN) | 2015 2 1027156 U |
| Dec. 10, 2015 | (CN) | 2015 2 1027158 U |
| Dec. 10, 2015 | (CN) | 2015 2 1027550 U |
| Dec. 10, 2015 | (CN) | 2015 2 1028726 U |
| Dec. 10, 2015 | (CN) | 2015 2 1028730 U |
| Dec. 10, 2015 | (CN) | 2015 2 1028739 U |
| Dec. 10, 2015 | (CN) | 2015 2 1028779 U |
| Dec. 10, 2015 | (CN) | 2015 2 1028784 U |
| Dec. 10, 2015 | (CN) | 2015 2 1028812 U |
| Dec. 10, 2015 | (CN) | 2015 2 1028814 U |
| Dec. 10, 2015 | (CN) | 2015 2 1028913 U |
| Dec. 10, 2015 | (CN) | 2015 2 1029002 U |
| Dec. 10, 2015 | (CN) | 2015 2 1029087 U |
| Dec. 10, 2015 | (CN) | 2015 2 1029798 U |
| Dec. 10, 2015 | (CN) | 2015 2 1030034 U |
| Mar. 1, 2016 | (CN) | 2016 1 0114861 |
| Mar. 1, 2016 | (CN) | 2016 2 0155481 U |

(51) Int. Cl.

| | |
|---|---|
| *A47L 5/30* | (2006.01) |
| *A47L 9/10* | (2006.01) |
| *A47L 9/14* | (2006.01) |
| *A47L 5/28* | (2006.01) |
| *A47L 9/16* | (2006.01) |
| *A47L 5/22* | (2006.01) |
| *A47L 9/00* | (2006.01) |
| *A47L 9/28* | (2006.01) |
| *F16D 23/12* | (2006.01) |
| *A47L 9/24* | (2006.01) |

(52) U.S. Cl.
CPC .......... *A47L 9/0411* (2013.01); *A47L 9/0477* (2013.01); *A47L 9/102* (2013.01); *A47L 9/1409* (2013.01); *A47L 9/16* (2013.01); *A47L 9/1683* (2013.01); *F16H 7/0827* (2013.01); *A47L 5/22* (2013.01); *A47L 9/00* (2013.01); *A47L 9/248* (2013.01); *A47L 9/28* (2013.01); *A47L 9/2852* (2013.01); *F16D 2023/126* (2013.01)

(58) Field of Classification Search
USPC .......................................................... 15/390
See application file for complete search history.

(56) References Cited

U.S. PATENT DOCUMENTS

| | | | | |
|---|---|---|---|---|
| 4,686,736 | A | * | 8/1987 | Petralia ..................... A47L 5/30 15/332 |
| 6,044,520 | A | * | 4/2000 | Yamamoto ................ A47L 5/30 15/351 |
| 2008/0078041 | A1 | | 4/2008 | Mitchel et al. |

FOREIGN PATENT DOCUMENTS

| | | |
|---|---|---|
| CN | 2845692 Y | 12/2006 |
| CN | 101201123 A | 6/2008 |
| CN | 101310668 A | 11/2008 |
| CN | 201469188 U | 5/2010 |
| CN | 202161266 U | 3/2012 |
| CN | 202235160 U | 5/2012 |
| CN | 202277305 U | 6/2012 |
| CN | 202801482 U | 3/2013 |
| CN | 203970286 U | 12/2014 |
| CN | 204520516 U | 8/2015 |
| CN | 105011857 A | 11/2015 |
| CN | 105030158 A | 11/2015 |
| CN | 205251414 U | 5/2016 |
| CN | 205251415 U | 5/2016 |
| CN | 205251416 U | 5/2016 |
| CN | 205251418 U | 5/2016 |
| CN | 205338839 U | 6/2016 |
| CN | 205338840 U | 6/2016 |
| CN | 205625812 U | 10/2016 |
| EP | 1736088 A2 | 12/2006 |
| JP | S5248277 A | 4/1977 |
| JP | 2005102892 A | 4/2005 |

OTHER PUBLICATIONS

Jiangsu Midea Electrical Appliance Co. Ltd., First Office Action, CN201510917497.8, dated Jun. 7, 2017, 10 pgs.
Jiangsu Midea Electrical Appliance Co. Ltd., First Office Action, CN201510917498.2, dated Jun. 16, 2017, 10 pgs.
Jiangsu Midea Electrical Appliance Co. Ltd., First Office Action, CN201510917499.7, dated May 26, 2017, 6 pgs.
Jiangsu Midea Electrical Appliance Co. Ltd., First Office Action, CN201510917528.X, dated Jun. 1, 2017, 15 pgs.
Jiangsu Midea Electrical Appliance Co. Ltd., First Office Action, CN201510917653.0, dated Jun. 5, 2017, 14 pgs.
Jiangsu Midea Electrical Appliance Co. Ltd., First Office Action, CN201510918541.7, dated Jun. 2, 2017, 10 pgs.
Jiangsu Midea Electrical Appliance Co. Ltd., First Office Action, CN201510918544.0, dated Jun. 28, 2017, 10 pgs.
Jiangsu Midea Electrical Appliance Co. Ltd., First Office Action, CN201510918580.7, dated Jun. 1, 2017, 10 pgs.
Jiangsu Midea Electrical Appliance Co. Ltd., First Office Action, CN201510918662.1, dated Jun. 1, 2017, 9 pgs.
Jiangsu Midea Electrical Appliance Co. Ltd., First Office Action, CN201610114861.1, dated Aug. 1, 2017, 10 pgs.
Midea International Search Report and Written Opinion, PCT/CN2016/075615, dated Aug. 26, 2016, 16 pgs.

\* cited by examiner

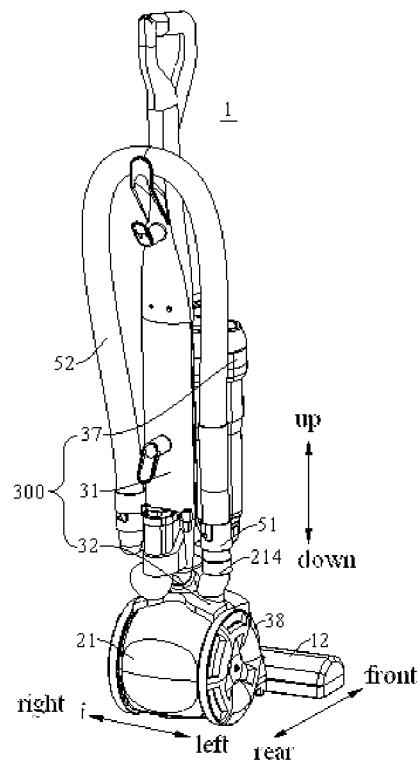
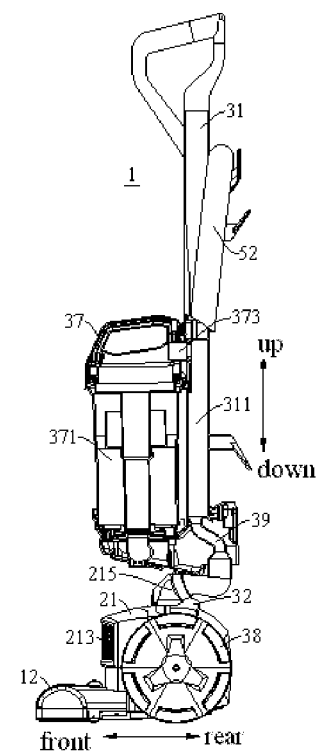
Fig. 8    Fig. 9
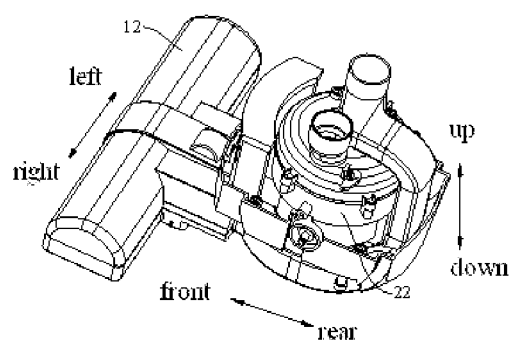
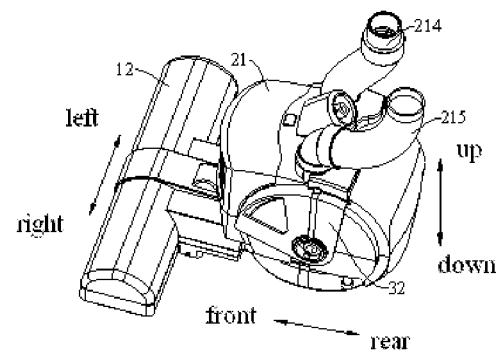
Fig. 10    Fig. 11

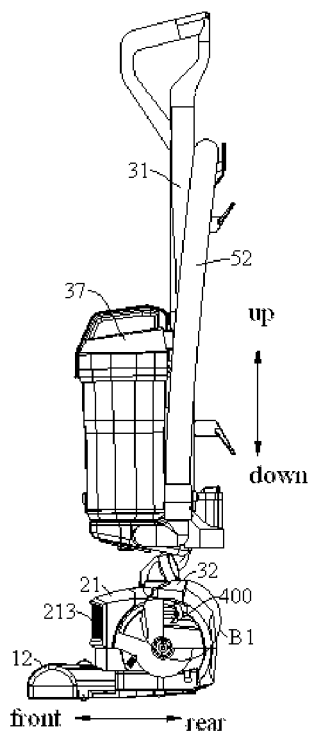
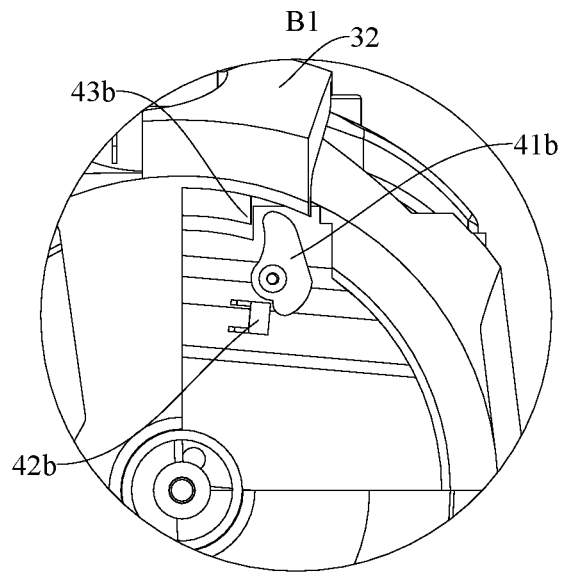
Fig. 24  Fig. 25
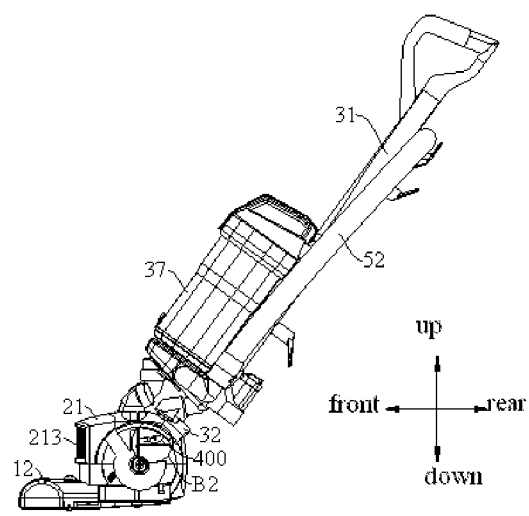
Fig. 26

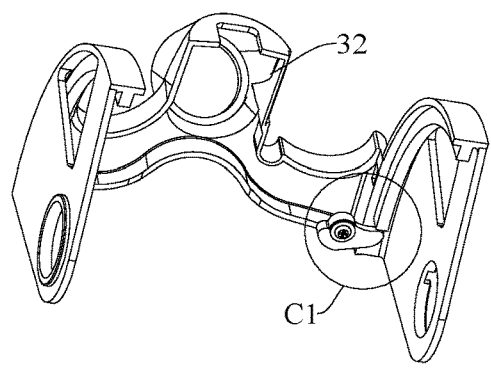
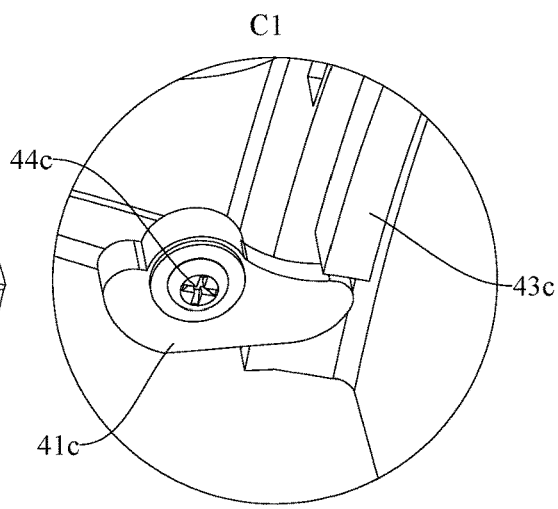
Fig. 33　　　　　　　　Fig. 34
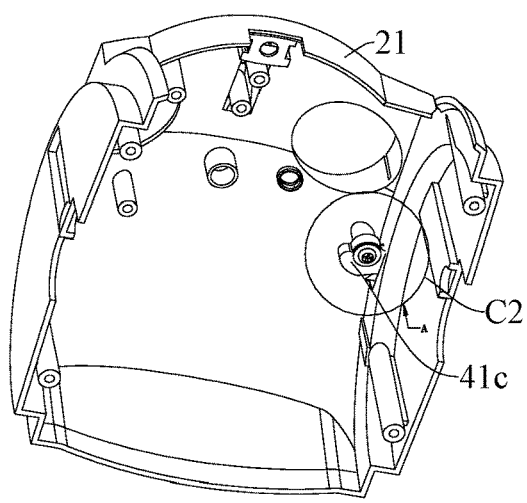
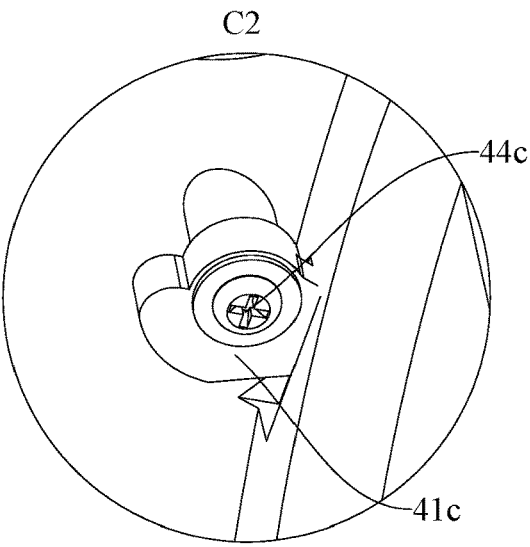
Fig. 35　　　　　　　　Fig. 36
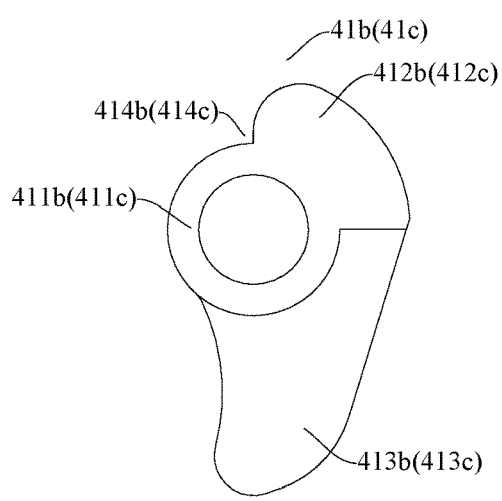
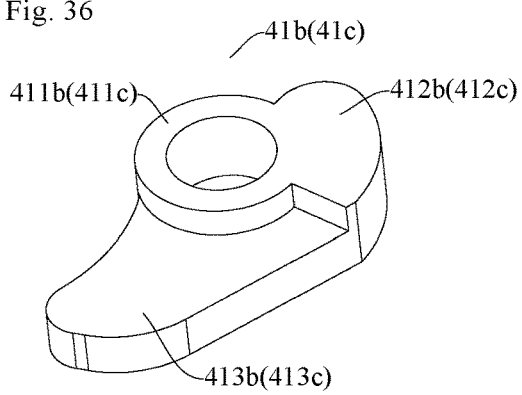
Fig. 37　　　　　　　　Fig. 38

CYCLONIC SEPARATING DEVICE FOR UPRIGHT VACUUM CLEANER AND UPRIGHT VACUUM CLEANER HAVING THE SAME

PRIORITY CLAIM AND RELATED APPLICATIONS

This application is a continuation application of PCT Patent Application No. PCT/CN2016/075615, entitled "CYCLONIC SEPARATION DEVICE FOR UPRIGHT VACUUM CLEANER AND UPRIGHT VACUUM CLEANER HAVING THE SAME" filed on Mar. 4, 2016, which claims priority to Chinese Patent Application No. 201510917499.7, entitled "UPRIGHT VACUUM CLEANER" filed on Dec. 10, 2015, Chinese Patent Application No. 201521029002.X, entitled "UPRIGHT VACUUM CLEANER", filed on Dec. 10, 2015, Chinese Patent Application No. 201510917466.2, entitled "UPRIGHT VACUUM CLEANER", filed on Dec. 10, 2015, Chinese Patent Application No. 201521028726.2, entitled "UPRIGHT VACUUM CLEANER", filed on Dec. 10, 2015, Chinese Patent Application No. 201510917497.8, entitled "UPRIGHT VACUUM CLEANER", filed on Dec. 10, 2015, Chinese Patent Application No. 201521028730.9, entitled "UPRIGHT VACUUM CLEANER", filed on Dec. 10, 2015, Chinese Patent Application No. 201521029087.1, entitled "UPRIGHT VACUUM CLEANER", filed on Dec. 10, 2015, Chinese Patent Application No. 201510918662.1, entitled "UPRIGHT VACUUM CLEANER", filed on Dec. 10, 2015, Chinese Patent Application No. 201521028812.3, entitled "UPRIGHT VACUUM CLEANER", filed on Dec. 10, 2015, Chinese Patent Application No. 201510918544.0, entitled "UPRIGHT VACUUM CLEANER", filed on Dec. 10, 2015, Chinese Patent Application No. 201521028739.X, entitled "UPRIGHT VACUUM CLEANER", filed on Dec. 10, 2015, Chinese Patent Application No. 201510918580.7, entitled "UPRIGHT VACUUM CLEANER", filed on Dec. 10, 2015, Chinese Patent Application No. 201521027156.5, entitled "UPRIGHT VACUUM CLEANER", filed on Dec. 10, 2015, Chinese Patent Application No. 201510917498.2, entitled "UPRIGHT VACUUM CLEANER", filed on Dec. 10, 2015, Chinese Patent Application No. 201521027158.4, entitled "UPRIGHT VACUUM CLEANER", filed on Dec. 10, 2015, Chinese Patent Application No. 201521028814.2, entitled "UPRIGHT VACUUM CLEANER", filed on Dec. 10, 2015, Chinese Patent Application No. 201521028779.4, entitled "UPRIGHT VACUUM CLEANER", filed on Dec. 10, 2015, Chinese Patent Application No. 201521029798.9, entitled "UPRIGHT VACUUM CLEANER", filed on Dec. 10, 2015, Chinese Patent Application No. 201510918541.7, entitled "UPRIGHT VACUUM CLEANER", filed on Dec. 10, 2015, Chinese Patent Application No. 201521027550.9, entitled "UPRIGHT VACUUM CLEANER", filed on Dec. 10, 2015, Chinese Patent Application No. 201510917653.0, entitled "UPRIGHT VACUUM CLEANER", filed on Dec. 10, 2015, Chinese Patent Application No. 201521028784.5, entitled "UPRIGHT VACUUM CLEANER", filed on Dec. 10, 2015, Chinese Patent Application No. 201510917528.X, entitled "UPRIGHT VACUUM CLEANER", filed on Dec. 10, 2015, Chinese Patent Application No. 201521028913.0, entitled "UPRIGHT VACUUM CLEANER", filed on Dec. 10, 2015, Chinese Patent Application No. 201521030034.1, entitled "UPRIGHT VACUUM CLEANER", filed on Dec. 10, 2015, and Chinese Patent Application No. 201610114861.1, entitled "UPRIGHT VACUUM CLEANER", filed on Mar. 1, 2016, and Chinese Patent Application No. 201620155481.8, entitled "UPRIGHT VACUUM CLEANER" filed on Mar. 1, 2016, all of which are incorporated by reference in their entirety.

TECHNICAL FIELD

The present disclosure relates to a technical field of vacuum cleaners, and more particularly to a cyclonic separating device for an upright vacuum cleaner and an upright vacuum cleaner with the same.

BACKGROUND

An upright vacuum cleaner in the related art includes a ground brush assembly, a motor assembly and a body assembly, in which the body assembly may include a body and a cyclonic separating device; the separating device includes a dirt cup and a separation assembly disposed in the dirt cup; the separation assembly includes a filter and a cyclonic cone assembly integrally molded. That is, the filter and the cyclonic cone assembly have an integral structure and cannot be detached from each other. Due to the integral structure of the separation assembly, the upright vacuum is easily enwound with hairs during use, which is not easy to clean up and may even affect the normal working of the upright vacuum cleaner in serious cases.

SUMMARY

The present disclosure seeks to solve at least one of the problems existing in the related art. Thus, an objective of the present disclosure aims to provide a cyclonic separating device for an upright vacuum cleaner to address the problem of being enwound by hairs and to facilitate cleaning up.

Another objective of the present disclosure aims to provide an upright vacuum cleaner with the cyclonic separating device.

According to the embodiments of a first aspect of the present disclosure, the cyclonic separating device includes: a dirt cup including an air inlet and an air outlet; a filter disposed in the dirt cup and including a filter inlet and a filter outlet communicating the filter inlet to the air outlet; and a cyclonic cone assembly including a cyclone cylinder and a cyclonic guide, in which a first end of the cyclone cylinder is connected to the air inlet, and the cyclonic guide is fitted in a second end of the cyclone cylinder and is detachably fitted over the filter to spirally guide dirty air introduced into the cyclone cylinder from the air inlet to the filter inlet.

In the cyclonic separating device according to the embodiments of the present disclosure, the dirty air entering the cyclone cylinder from the air inlet are spirally guided to the filter inlet of the filter, and the cyclonic guide of the cyclonic cone assembly is detachably fitted over the filter, which may not only address the problem of being enwound by hairs but also facilitate cleaning up.

According to an example of the present disclosure, the cyclonic guide includes a first cylindrical surface and the filter includes a second cylindrical surface, the cyclonic guide being detachably fitted over the filter by the first cylindrical surface and the second cylindrical surface.

According to an example of the present disclosure, the filter is configured as a cylinder with an open end and a closed end; the open end of the filter defines the filter outlet and the filter inlet is formed on a side wall of the filter.

According to an example of the present disclosure, the filter includes a first section and a second section; the first section is configured to be a solid cylinder while the second section is configured to be a hollow cylinder; a first end of the second section is connected to a first end of the first section and a second end of the second section is open to define the filter outlet, and the filter inlet is formed on a side wall of the second section.

According to an example of the present disclosure, the filter inlet includes a plurality of filter pores that are evenly spaced apart and distributed in an axial direction and/or a circumferential direction of the second section.

According to an example of the present disclosure, the cyclonic guide includes: a sleeve defines a portion fitted over the first section; and a guide plate disposed between the sleeve and the cyclone cylinder to define, along with the sleeve and the cyclone cylinder, a spiral channel for the dirty air to spirally flow from the air inlet to the filter inlet.

According to an example of the present disclosure, the sleeve and the guide plate are molded integrally.

According to an example of the present disclosure, the cyclone cylinder and the cyclonic guide are fixedly connected to each other.

According to an example of the present disclosure, the cyclone cylinder and the cyclonic guide are connected to thread or in a hot-melt manner via ultrasonic waves.

According to the embodiments of a second aspect of the present disclosure, the upright vacuum cleaner includes: a brushroll; a motor assembly including a motor housing and a motor disposed within the motor housing, in which a rotating axis of the motor and a rotating axis of the brushroll are disposed in a non-parallel manner, and the motor drives the brushroll rolling by a drive belt and is rotatable between a first upright position of tensioning the drive belt and a first oblique position of loosening the drive belt; a body assembly including a body, a bridging member mounted on the body and a cyclonic separating device for the upright vacuum cleaner according to the above embodiments, in which the bridging member is rotatably connected to the motor housing to make the body rotatable between a second upright position and a second oblique position. The motor is moved from the first oblique position to the first upright position by the bridging member when the body moves from the second upright position to the second oblique position.

In the upright vacuum cleaner according to the embodiments of the present disclosure, it is possible to guarantee the working reliability and the vacuuming efficiency of the upright vacuum cleaner by disposing the cyclonic separating device according to the embodiments of the first aspect of the present disclosure.

According to an example of the present disclosure, the upright vacuum cleaner further includes a clutching device disposed between the bridging member and the motor, in which the motor is moved from the first oblique position to the first upright position by the bridging member via the clutching device, when the body moves from the second upright position to the second oblique position.

According to an example of the present disclosure, the clutching device includes: a first toggling block fixed on the motor; a second toggling block disposed on the bridging member; and a lever cam member rotatably disposed on the motor housing and defining two ends in cooperation with the first toggling block and the second toggling block respectively.

According to an example of the present disclosure, the clutching device includes: a first sliding rail disposed on the bridging member; a toggling tongue fixed on the motor and rotatable relative to the motor housing; and a lever member defining a first end slidably cooperating with the first sliding rail and a second end cooperating with an end of the toggling tongue.

According to an example of the present disclosure, the clutching device includes: a slide chute formed on the bridging member; and a triggering member rotatably supported on the motor housing and defining a first end with a sliding column slidably cooperating with the slide chute and a second end having a toggling rod adapted for prodding the movement of the motor. The sliding column slides along the slide chute to make the triggering member rotate when the bridging member drives the movement of the slide chute, and the toggling rod prods the rotation of the motor relative to the motor housing when the triggering member rotates.

According to an example of the present disclosure, the clutching device includes: a second sliding rail formed on the bridging member and defining a tail end having a second sliding rail tail groove formed by a recess in a surface of the tail end of the second sliding rail; and a lever rotating member rotatably disposed on the motor housing and defining two ends cooperating with the second sliding rail and the motor respectively, in which when the body moves from the second upright position to the second oblique position, a first end of the lever rotating member slides from the second sliding rail tail groove to the second sliding rail, and the motor is moved from the first oblique position to the first upright position by a second end of the lever rotating member.

According to an example of the present disclosure, the second sliding rail is configured as an arc second sliding rail with a rotating axis of the bridging member as a central axis.

According to an example of the present disclosure, an elastic member is disposed between the motor and the motor housing and is configured to push the motor moving from the first upright position to the first oblique position when the body moves from the second oblique position to the second upright position.

According to an example of the present disclosure, the drive belt is winded upon a central part in a direction of the axis of the brushroll.

According to an example of the present disclosure, the upright vacuum cleaner further includes a brushroll casing disposed outside the brushroll and including a brushroll air-suction channel and a drive-belt mounting chamber for mounting the drive belt, in which the brushroll air-suction channel includes a first air-suction channel and a second air-suction channel located at both sides of the drive-belt mounting chamber.

According to an example of the present disclosure, the first air-suction channel and the second air-suction channel are disposed symmetrically with respect to the drive belt.

According to an example of the present disclosure, the upright vacuum cleaner further includes two wheels disposed at two sides of the motor housing respectively and rotatably connected to the motor housing, in which the bridging member includes a top plate and two side plates connected at both sides of the top plate, the two side plates being clamped between two side walls of the motor housing and the corresponding wheels respectively and rotatably connected to the motor housing.

According to an example of the present disclosure, the top plate of the bridging member is provided with a first connecting pipe that defines a positioning column therein; the body is provided with a second connecting pipe at a lower end thereof; and a baffle is provided with a positioning cartridge that is fitted over the positioning column after the second connecting pipe is inserted into the first connecting pipe.

Additional aspects and advantages of embodiments of present disclosure will be given in part in the following descriptions, become apparent in part from the following descriptions, or be learned from the practice of the present disclosure.

BRIEF DESCRIPTION OF THE DRAWINGS

FIG. 8 is a schematic view of an upright vacuum cleaner according to another embodiment of the present disclosure;

FIG. 9 is a side view of the upright vacuum cleaner of FIG. 8;

FIG. 10 is an assembly drawing of a brushroll assembly and a motor assembly of an upright vacuum cleaner according to an embodiment of the present disclosure;

FIG. 11 is an assembly drawing of a brushroll assembly and a motor assembly of an upright vacuum cleaner according to another embodiment of the present disclosure;

FIG. 24 is a schematic view of an upright vacuum cleaner when a body is located at a second upright position according to an embodiment of the present disclosure;

FIG. 25 is an enlarged view of part B1 of FIG. 24;

FIG. 26 is a schematic view of the upright vacuum cleaner of FIG. 24 when the body is located at a second oblique position;

FIG. 33 is an assembly drawing of a bridging member and a lever cam member of the upright vacuum cleaner of FIG. 32;

FIG. 34 is an enlarged view of part C1 of FIG. 33;

FIG. 35 is an assembly drawing of a motor housing and a lever cam member of the upright vacuum cleaner of FIG. 22;

FIG. 36 is an enlarged view of part C2 of FIG. 35;

FIG. 37 is a front view of a lever cam member of an upright vacuum cleaner according to an embodiment of the present disclosure;

FIG. 38 is a perspective view of the lever cam member of the upright vacuum cleaner of FIG. 37;

Figure 1:
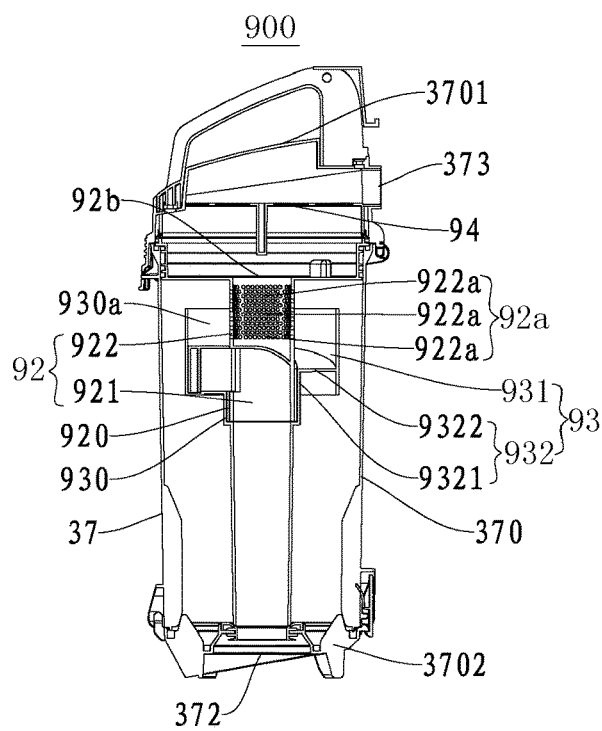
FIG. 1 is a schematic view of a cyclonic separating device according to an embodiment of the present disclosure.

REFERENCE NUMERALS 1 upright vacuum cleaner
100 brushroll assembly 11 brushroll
111 first brushroll section
1111 first body
1112 first bristle
112 second brushroll section
1121 second body
1122 second bristle
113 connecting-shaft section
12 brushroll casing
122 brushroll air-suction channel
1221 first air-suction channel
1222 second air-suction channel
123 drive-belt mounting chamber
124 upper casing
125 lower casing
13 drive belt
14 tensioning wheel
200 motor assembly
21 motor housing
211 dirty air outlet
212 clean air inlet
213 air exhaust hole
214 dirty air output pipe
215 clean air input pipe
216 motor air-suction channel
2161 first branch channel
2162 second branch channel
217 second column
22 motor
221 motor shaft
222 motor casing
223 first column
224 spring
300 body assembly
31 body
311 body air-exhaust channel
32 bridging member
321 top plate
3213 second sliding rail
3214 second sliding rail tail groove
322 side plate
33 connecting pipe assembly
331 first connecting pipe
332 second connecting pipe
34 positioning assembly
341 first positioning piece
342 second positioning piece
35 limiting column
36 elastic member
37 dirt cup
370 dirt-cup body
3701 dirt-cup upper cover
3702 dirt-cup lower cover
371 separating chamber
372 air inlet
373 air outlet
38 wheel
39 air exhaust pipe
400 clutching device
41a slide chute
42a triggering member
421a first triggering part
4211a sliding column
422a second triggering part
4221a toggling rod
4222a oblique surface
423a pivot section
41b (41c) lever cam member
411b (411c) rotary joint
412b (412c) first toggling part
413b (413c) second toggling part
414b (414c) retaining groove
42b (42c) first toggling block
43b (43c) second toggling block
44b (44c) first rotating shaft
41d first sliding rail
411d stopping block
42d toggling tongue
421d rotational part
422d tongue part
43d lever member
431d hook
44d second rotating shaft
41e lever rotating member
411e rotational mounting part
412e third toggling part
413e fourth toggling part
51 air-inlet pipe
52 hose
900 cyclonic separating device
92 filter
92a filter inlet
922a filter pore
92b filter outlet
920 second cylindrical surface
921 first section
922 second section
93 cyclonic cone assembly
930 first cylindrical surface
930a spiral channel
931 cyclone cylinder
932 cyclonic guide
9321 sleeve
9322 guide plate
94 filter assembly

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

The following description provides many different embodiments or examples to realize different structures of the present disclosure. To simplify the description of the present disclosure, components and configurations in specific examples are elaborated. Of course, they are explanatory, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

A cyclonic separating device 900 for an upright vacuum cleaner according to the embodiments of the present disclosure will be described with reference to FIGS. 1 to 3. An up-and-down direction refers to the up-and-down direction when the cyclonic separating device 900 is in normal use.

As shown in FIG. 1, the cyclonic separating device 900 according to the embodiments of a first aspect of the present disclosure includes a dirt cup 37, a filter 92 and a cyclonic cone assembly 93. The dirt cup 37 may include an air inlet 372 and an air outlet 373; dirty air with dust and debris may enter the dirt cup 37 from the air inlet 372, and the impurities may be intercepted in the dirt cup 37 through filtration of the filter 92; clean air may be exhausted from the air outlet 373 to realize the separation of impurities and air.

The filter 92 may be disposed in the dirt cup 37. As shown in FIG. 1, the filter 92 includes a filter inlet 92a and a filter outlet 92b communicating between the filter inlet 92a and the air outlet 373. The dirty air entering the dirt cup 37 may enter the filter 92 from the filter inlet 92a, and clean air through filtration of the filter 92 may be exhausted from the air outlet 373 via the filter outlet 92b to complete the separation of impurities and air.

Figure 2:
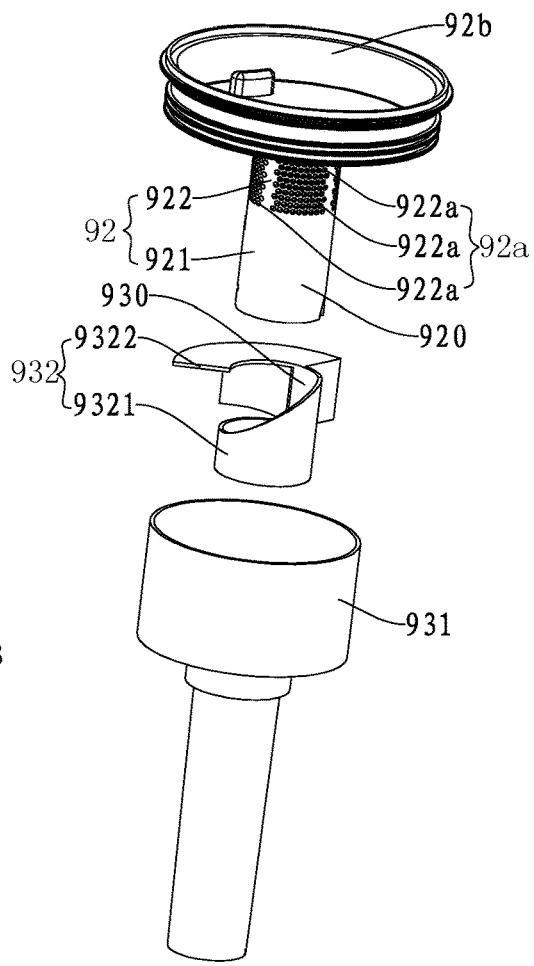
FIG. 2 is an explosive view of a partial structure of a cyclonic separating device according to an embodiment of the present disclosure.
Figure 3:
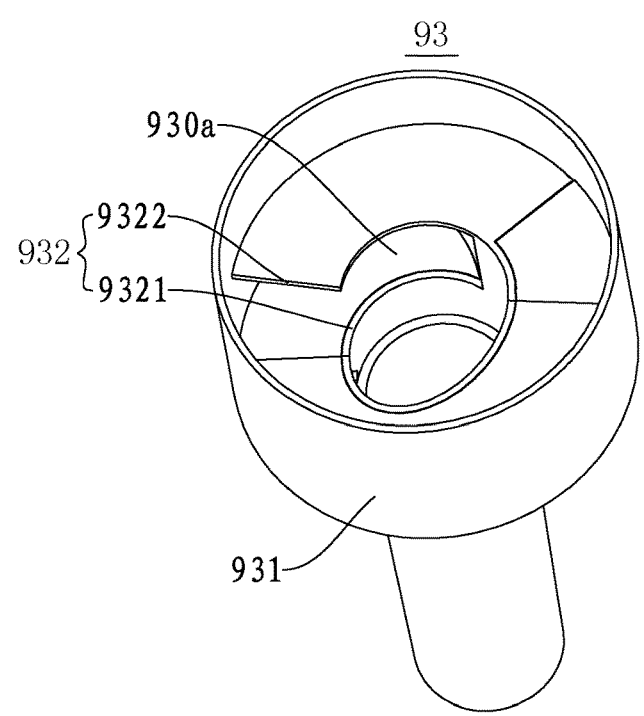
FIG. 3 is a perspective view of a cyclonic cone assembly of a cyclonic separating device according to an embodiment of the present disclosure.

As shown in FIGS. 1 to 3, the cyclonic cone assembly 93 includes a cyclone cylinder 931 and a cyclonic guide 932. Specifically, a first end of the cyclone cylinder 931 may be communicated with the air inlet 372, and the cyclonic guide 932 may be fitted in a second end of the cyclone cylinder 931 and is detachably fitted over the filter 92 to spirally guide the dirty air introduced into the cyclone cylinder 931 from the air inlet 372 to the filter inlet 92a.

That is, the dirty air introduced into the cyclone cylinder 931 from the air inlet 372 may flow spirally under the guidance of the cyclonic guide 932, and then enters the filter 92 from the filter inlet 92a for filtration; the dust and debris may be intercepted by the filter 92, and clean air may flow out from the filter outlet 92b and flow out from the dirt cup 37 via the air outlet 373 to complete the separation. Since the dirty air spirally flows into the filter 92 from the filter inlet 92a, it is possible to prevent hairs from enwinding the filter 92 to some extent.

Moreover, as the cyclonic guide 932 is detachably fitted over the filter 92, the filter 92 may be cleaned after the cyclonic cleaner 932 is removed from the filter 92, so as to solve the difficulty of cleaning up the filter 92 with enwinding hairs.

In the cyclonic separating device 900 for the upright vacuum cleaner of embodiments of the present disclosure, the dirty air that enters the cyclone cylinder 931 from the air inlet 372 is spirally guided to the filter inlet 92a of the filter 92, and the cyclonic guide 932 of the cyclonic cone assembly 93 is detachably fitted over the filter 92, so it is possible to address the problem of tangled hairs and to facilitate cleaning up.

According to some embodiments of the present disclosure, as shown in FIG. 1 and FIG. 2, the cyclonic guide 932 may include a first cylindrical surface 930, and the filter 92 may include a second cylindrical surface 920, the cyclonic guide 932 being detachably fitted over the filter 92 by the first cylindrical surface 930 and the second cylindrical surface 920. Consequently, the cyclonic guide 932 may stably and closely fitted with the filter 92, which is convenient to assemble or disassemble and has high reliability. Additionally, the cyclonic guide 932 and the filter 92 are fitted with each other by the cylindrical surfaces, so as to facilitate cleaning up the tangled hairs.

As an alternative embodiment, as shown in FIG. 1 and FIG. 2, the filter 92 may be configured as a cylinder with an open end (e.g. an upper end shown in FIG. 1) and a closed end (e.g. a lower end shown in FIG. 1); the open end of the filter 92 may define the filter outlet 92b and the filter inlet 92a may be formed on a side wall of the filter 92. Therefore, the dirty air may enter the filter 92 from the filter inlet 92a in the side wall of the filter 92, and clean air after filtration may flow out from the filter outlet 92b at the open end. Thus, the filter 92 is easy to manufacture and has a good filtration effect.

Further, the filter 92 may include a first section 921 and a second section 922. As shown in FIG. 1 and FIG. 2, the first section 921 may be configured to be a solid cylinder while the second section 922 may be configured to be a hollow cylinder; a first end (e.g. a lower end shown in FIG. 1) of the second section 922 is connected to a first end (e.g. an upper end shown in FIG. 1) of the first section 921 and a second end (an upper end shown in FIG. 1) of the second section 922 is open to define the filter outlet 92b, and the filter inlet 92a may be formed on the side wall of the second section 922. Accordingly, the filter 92 has a simple and compact structure and is easy to manufacture and process. Moreover, since the first section 921 and the second section 922 are both circular, and are not blocked externally by other parts. If hairs enwind the filter 92, the cyclonic guide 932 may be removed from the filter 92 to clean up the hairs on the filter 92, which is easy to assemble and dissemble only with less effort. Also, the filter 92 of this structure may shorten the air flow path effectively to improve the filtration efficiency.

Alternatively, the filter inlet 92a may include a plurality of filter pores 922a that are evenly spaced apart and distributed in an axial direction and/or a circumferential direction of the second section 922. In other words, the plurality of filter pores 922a may be spaced evenly along the axial direction of the second section 922; or the plurality of filter pores 922a may be spaced evenly along the circumferential direction of the second section 922; or the plurality of filter pores 922a may be spaced evenly along the axial and circumferential directions of the second section 922, as shown in FIG. 1 and FIG. 2. On one hand, large particles (like debris) may be intercepted by the filter pores 922a to realize preliminary separation of the dirty air; on the other hand, the dirty air may enter the filter 92 evenly to reduce the probability of forming a vortex due to the uneven air inlet, so as to improve the filtration efficiency.

In some embodiments of the present disclosure, as shown in FIG. 1 to FIG. 3, the cyclonic guide 932 may include a sleeve 9321 and a guide plate 9322. A part of the sleeve 9321 is fitted over the first section 921 with the solid cylindrical structure to avoid blocking the filter inlet 92a on the second section 922; the guide plate 9322 may be disposed between the sleeve 9321 and the cyclone cylinder 931 to define, along with the sleeve 9321 and the cyclone cylinder 931, a spiral channel 930a for the dirty air to spirally flow in the spiral channel 930a when the dirty air with dust and debris flows from the air inlet 372 to the filter inlet 92a. For example, as shown in FIG. 1 to FIG. 3, the sleeve 9321 is disposed in the cyclone cylinder 931, the guide plate 9322 is disposed between the sleeve 9321 and the cyclone cylinder 931 and extends spirally in a direction from the first section 921 to the second section 922, such that the sleeve 9321, the cyclone cylinder 931 and the guide plate 9322 may together define the spiral channel 930, and dirty air with dust and debris may flow spirally in the spiral channel 930 when flowing from the air inlet 372 to the filter inlet 92a. Thus, the dirty air may flow more smoothly, and the debris and hairs in the dirty air may be hurled out by the centrifugal force during the spiral flow, so as to reduce the probability of enwinding the filter 92 by the hairs.

Alternatively, the sleeve 9321 and the guide plate 9322 are molded integrally. That is, the cyclonic guide 932 may be molded in one piece for the convenience of processing and low cost. In addition, the spiral channel 930*a* defined in the cyclonic guide 932 has a firm structure and thus lowers the probability of failure and deformation, so as to improve the working reliability of the cyclonic guide 932.

According to some embodiments of the present disclosure, the cyclone cylinder 931 and the cyclonic guide 932 may be fixedly connected to each other, i.e. without relative movement between the cyclone cylinder 931 and the cyclonic guide 932. Thus, the stability and reliability between the cyclone cylinder 931 and the cyclonic guide 932 may be improved to reduce the probability of being damaged.

Alternatively, the cyclone cylinder 931 and the cyclonic guide 932 may be connected to thread. For example, the cyclone cylinder 931 may be connected on the cyclonic guide 932 by a bolt. Or the cyclone cylinder 931 and the cyclonic guide 932 may be connected in a hot-melt manner via ultrasonic waves to further enhance the fastness and reliability of the connection.

In order to improve the separation effect of the cyclonic separating device 900, the cyclonic separating device 900 may further include a filter assembly 94. As shown in FIG. 1, the filter assembly 94 may be disposed in the dirt cup 37 and located between the filter outlet 92*b* and the air outlet 373. Thus, the air through filtration of the filter 92 may be filtered again by the filter assembly 94 to intercept small-particle impurities like dust to improve the purity of the air exhausted from the air outlet 373.

Alternatively, the dirt cup 37 may be transparent. Since the dirt cup 37 is transparent, the user may observe the filtration in the cyclonic separating device 900 conveniently. If there are too many impurities intercepted in the cyclonic separating device 900, the user may remove the dirt cup 37 to clean the cyclonic separating device 900 to clear the impurities intercepted in the dirt cup 37, and finally mount the cyclonic separating device 900 for use again. If the filter 92 is enwound by hairs, the user may remove the cyclonic guide 932 from the filter 92 to clear up the tangled hairs on the filter 92, and then mount the cyclonic guide 932 and the filter 92 in the dirt cup 37 for further use.

In some embodiments of the present disclosure, the dirt cup 37 may include a dirt-cup body 370, a dirtcup upper cover 3701 and a dirt-cup lower cover 3702. As shown in FIG. 1, the dirt-cup lower cover 3702 and the dirtcup upper cover 3701 may disposed at the lower and upper ends of the dirt-cup body 370, in which the air inlet 372 may be formed in the dirt-cup lower cover 3702 while the air outlet 373 may be formed in the dirtcup upper cover 3701.

Alternatively, as shown in FIG. 1, the air inlet 372 may be formed in a bottom wall of the dirt-cup lower cover 3702, and the air outlet 373 may be formed in a side wall of the dirtcup upper cover 3701 to improve the aesthetics and to facilitate the overall layout of the air channel system of the upright vacuum cleaner.

The working process of the cyclonic separating device 900 for the upright vacuum cleaner according to the embodiments of the present disclosure will be descried in detail with reference to FIGS. 1 to 3.

When the upright vacuum cleaner operates, a vacuuming device sucks the dirty air with dust and debris, and the dirty air enters the dirt cup 37 from the air inlet 372 on the dirt-cup lower cover 3702, and enters the cyclone cylinder 931 from its lower end to move from down to up in the cyclone cylinder 931.

Then, the dirty air enters the cyclonic guide 932 and flows spirally in the spiral channel 930*a* defined by the sleeve 9321, the cyclone cylinder 931 and the cyclonic guide 932 together. In such a case, the debris and hairs may be hurled out by the centrifugal force, so as to prevent the hairs form enwinding the filter 92.

The dirty air may enter the filter 92 via the filter pores 922*a* in the side wall of the second section 922 after flowing through the spiral channel 930*a*. The filter pores 922*a* may intercept the debris in the dirty air to implement the preliminary separation of impurities.

Then, the air in the filter 92 may flow to the filter assembly 94 from the filter outlet 92*b*, the small-particle impurities like dust may be intercepted by the filter assembly 94, clean air may flow through the filter assembly 94, thus realizing a further separation.

Finally, clean air is exhausted from the air outlet 373 on the dirtcup upper cover 3701, and the impurities are intercepted in the dirt cup 37. In such a way, separation of impurities and air is completed.

If the filter 92 is enwound by hairs, the user may remove the cyclonic guide 932 from the filter 92 to clear up the tangled hairs on the filter 92, and then mount the cyclonic guide 932 and the filter 92 in the dirt cup 37 for use again.

When the cyclonic separating device 900 is used for a certain time, the user finds that there are too many impurities intercepted in the cyclonic separating device 900, in which case the user may remove the dirt cup 37 to clean the cyclonic separating device 900 to clear the impurities intercepted in the dirt cup 37, and finally mount the cyclonic separating device 900 after cleaning for use again.

In conclusion, the cyclonic separating device 900 for the upright vacuum cleaner according to the embodiments of the present disclosure, the dirty air that enters the cyclone cylinder 931 from the air inlet 372 is spirally guided to the filter inlet 92*a* of the filter 92, and the cyclonic guide 932 of the cyclonic cone assembly 93 is detachably fitted over the filter 92, so it is possible to prevent the hairs from enwinding the filter 92 and to facilitate cleaning up.

An upright vacuum cleaner 1 according to the embodiments of the second aspect of the present disclosure will be described with reference to FIGS. 1 to 55.

Figure 4:
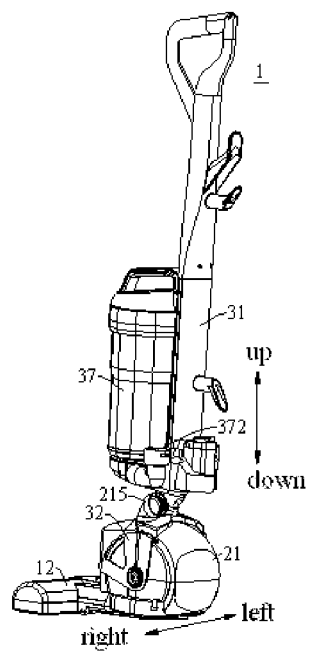
FIG. 4 is a schematic view of an upright vacuum cleaner according to an embodiment of the present disclosure.

The upright vacuum cleaner 1 according to the embodiments of the present disclosure includes a brushroll 11, a motor assembly 200, a body assembly 300 and the cyclonic separating device 900 for the upright vacuum cleaner 1 according to the above embodiments. Referring to FIG. 4, the brushroll 11 extends along a horizontal direction (i.e. a left-and-right direction as shown in FIG. 4); the motor assembly 200 is disposed in rear of the brushroll 11 and is connected to the brushroll 11 to drive the rotation of the brushroll 11 around its own center of rotation, so as to achieve a purpose of sweeping the floor; dusts, debris and dirty air swept by the brushroll 11 are sucked into a brushroll air-suction channel 122 via a dust suction port of a brushroll casing 12 and are processed in the body assembly 300.

Figure 5:
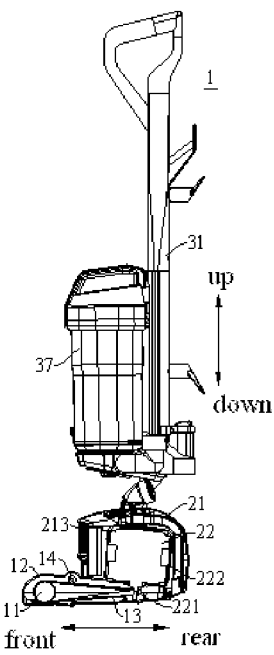
FIG. 5 is a side view of the upright vacuum cleaner of FIG. 4 when a motor is located at a first oblique position.

Further, the motor assembly 200 includes a motor housing 21 and a motor 22 disposed within the motor housing 21, in which a rotating axis of the motor 22 and a rotating axis of the brushroll 11 are disposed in a non-parallel manner, and the motor 22 drives the brushroll 11 rolling by a drive belt 13 and is rotatable between a first upright position of tensioning the drive belt 13 and a first oblique position of loosening the drive belt 13. Specifically, as shown in FIG. 4, the rotating axis of the brushroll 11 extends along the horizontal direction (i.e. the left-and-right direction as shown in FIG. 4); the rotating axis of the motor 22 and the rotating axis of the brushroll 11 are disposed in the non-parallel manner. For example, the rotating axis of the motor 22 may extend along a vertical direction (i.e. an up-and-down direction as shown in FIG. 5) or be disposed obliquely with respect to the vertical direction; the drive belt 13 is disposed between the motor 22 and the brushroll 11 and is connected to the motor 22 and the brushroll 11 respectively, such that the motor 22 may drive the brushroll 11 via the drive belt 13. An air exhaust hole 213, a dirty air output pipe 214 and a clean air input pipe 215 are disposed on the motor housing 21; the motor air-suction channel 216 and the motor air-exhaust channel are disposed in the motor housing 21. The motor air-suction channel 216 communicates between the dust suction port and the dirty air output pipe 214, while the motor air-exhaust channel communicates between the clean air input pipe 215 and the air exhaust hole 213.

The body assembly 300 includes a body 31, a bridging member 32 and a dirt cup 37 mounted on the body 31, and the cyclonic separating device 900 according to the above embodiments, in which the bridging member 32 is rotatably connected to the motor housing 21 to make the body 31 rotatable between a second upright position and a second oblique position. Alternatively, the dirt cup 37 is detachably disposed on the body 31 and defines a separating chamber 371 therein, and the separating chamber 371 is communicated with a dirty air outlet 211 and a clean air inlet 212 on the motor housing 21 respectively. Specifically, dirty air and dust are introduced into the brushroll air-suction channel 122 via the dust suction port of the brushroll casing 12, then into a motor air-suction channel 216 in the motor housing 21, and discharged into the separating chamber 371 of the dirt cup 37 via the dirty air outlet 211 on the motor housing 21; clean air obtained through filtration and processing of the dirt cup 37 enters a motor air-exhaust channel within the motor housing 21 via the clean air inlet 212 on the motor housing 21 and is discharged to the outside via an air exhaust hole 213 on the motor housing 21.

The motor 22 is moved from the first oblique position to the first upright position by the bridging member 32 when the body 31 moves from the second upright position to the second oblique position.

Thus, in the upright vacuum cleaner 1 according to the embodiments of the present disclosure, the rotating axis of the motor 22 and the rotating axis of the brushroll 11 are disposed in the non-parallel manner, so as to reduce a volume of the motor 22 and hence the occupation space of the upright vacuum cleaner 1. Further, the upright vacuum cleaner 1 controls the rotation of the brushroll 11 and generation of the dust suction flow simultaneously by one motor 22, which occupies smaller space with fewer parts, and can realize synchronous control over dust sweep and dust suction. Additionally, the motor of the upright vacuum cleaner 1 is disposed vertically to reduce the occupation space of the upright vacuum cleaner 1 and facilitate diverse arrangements of various parts of the upright vacuum cleaner 1.

In addition, by disposing the cyclonic separating device 900 that is not easily enwound by hairs and is easy to clean, it is possible to improve the working reliability and the filtration efficiency of the upright vacuum cleaner 1.

The upright vacuum cleaner 1 further includes a clutching device 400 disposed between the bridging member 32 and the motor 22, in which the motor 22 is moved from the first oblique position to the first upright position by the bridging member 32 via the clutching device 400, when the body 31 moves from the second upright position to the second oblique position.

Specifically, when the body 31 is located at the second upright position, an axis of a motor shaft 221 of the motor 22 is disposed obliquely backwards with respect to an axis of the motor housing 21. That is, the motor 22 is at the first oblique position. In such a case, two ends of the drive belt 13 are fitted over the brushroll 11 and the motor shaft 221 respectively, but the drive belt 13 is in a loosening state. When the body 31 is located at the second oblique position, the axis of the motor 22 extends along the vertical direction. That is, the motor 22 is at the first upright position, in which case the drive belt 13 is tensioned. When the body 31 is turned manually from the second upright position to the second oblique position, the bridging member 32 on the motor housing 21 rotates relative to the motor housing 21 and the motor 22 is moved from the first oblique position to the first upright position by the bridging member 32 via the clutching device 400. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

Figure 6:
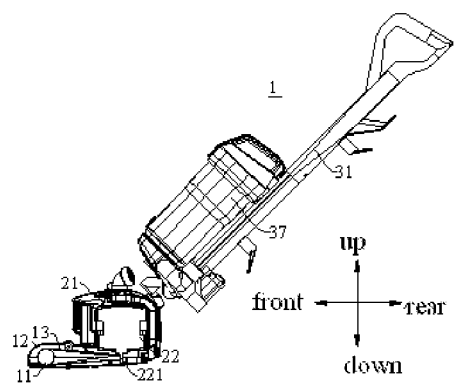
FIG. 6 is a side view of the upright vacuum cleaner of FIG. 4 when a motor is located at a first upright position.

Referring FIG. 4 to FIG. 6, the motor 22 is disposed in the motor housing 21 and is connected to a fan and the brushroll 11 respectively. The motor 22 may drive the rotation of the fan to generate an air flow so as to provide a vacuuming power; and the motor 22 may also drive the rotation of the brushroll 11 around its own axis so as to realize the purpose of cleaning the ground.

Further, the rotating axis of the motor 22 and the rotating axis of the brushroll 11 are disposed in the non-parallel manner, and the motor 22 drives the brushroll 11 rolling by the drive belt 13. Specifically, as shown in FIG. 4, the rotating axis of the brushroll 11 extends along the horizontal direction (i.e. the left-and-right direction as shown in FIG. 4); the rotating axis of the motor 22 and the rotating axis of the brushroll 11 are disposed in the non-parallel manner. For example, the rotating axis of the motor 22 may extend along the vertical direction (i.e. the up-and-down direction as shown in FIG. 5) or be disposed obliquely with respect to the vertical direction; the drive belt 13 is disposed between the motor 22 and the brushroll 11 and is connected to the motor 22 and the brushroll 11 respectively, such that the motor 22 may drive the brushroll 11 via the drive belt 13.

Alternatively, the motor 22 may be disposed near the ground. That is, the gravity of the motor 22 is lower than that of the motor 22 of the vacuum cleaner in the related art, such that for the vacuum cleaners having the body 31 of the same length, the upright vacuum cleaner in the present disclosure is convenient to operate and with less effort for the users. A switch on the body 31 of the upright vacuum cleaner 1 is controlled manually to start or stop the upright vacuum cleaner 1. When the upright vacuum cleaner 1 is started, the motor 22 drives the rotation of the fan and the brushroll 11 simultaneously to provide the vacuuming power. That is, various operations may be completed simply and conveniently by one button.

In the upright vacuum cleaner 1 according to the embodiments of the present disclosure, the rotating axis of the motor 22 and the rotating axis of the brushroll 11 are disposed in the non-parallel manner, so as to reduce the volume of the motor 22 and hence the occupation space of the upright vacuum cleaner 1, thereby facilitating diverse arrangements of various parts of the upright vacuum cleaner 1. Further, the upright vacuum cleaner 1 controls the rotation of the brushroll 11 and the fan simultaneously by one motor 22, which occupies smaller space with fewer parts, and realizes synchronous control over dust sweep and dust suction. The upright vacuum cleaner 1 has a simple and compact structure, so it occupies a small space and is convenient to operate.

In some specific embodiments of the present disclosure, the drive belt 13 is winded upon the motor shaft 221 of the motor 22 and the brushroll 11. The drive belt 13 is configured to be annular, in which a first end of the drive belt 13 is winded upon the motor shaft 221 of the motor 22 while a second end of the drive belt 13 is winded upon the brushroll 11. Since the rotating axis of the motor 22 (i.e. the rotating axis of the motor shaft 221 of the motor 22) and that of the brushroll 11 are disposed in the non-parallel manner, two ends of the drive belt 13 are twisted.

Referring to FIG. 5 and FIG. 6, the brushroll 11 and the motor 22 are spaced apart in a front-and-rear direction, and the brushroll 11 is located at a front side of the motor 22. The first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the rotation of the drive belt 13 due to a frictional resistance between the motor shaft 221 and a surface of the drive belt 13. Similarly, the drive belt 13 drives the rotation of the brushroll 11 around its own axis due to a frictional resistance between the brushroll 11 and the surface of the drive belt 13, thus realizing the rotation of the brushroll 11 driven by the motor 22. By disposing the drive belt 13 between the motor 22 and the brushroll 11, the motor 22 may drive the rotation of the fan and the brushroll 11 simultaneously. Compared with the vacuum cleaner in the related art that realizes control over the rotation of the fan and the brushroll 11 by two motors 22 respectively, the upright vacuum cleaner 1 has the simple structure and fewer parts, so it occupies the small space and is convenient to assemble and disassemble, which improves the assembling efficiency, and may realize synchronous control over dust sweep and dust suction as well.

A contact point of the drive belt 13 and the part winded up by the drive belt 13 is alterable, and a twist angle of the drive belt 13 between two adjacent alterable contact points ranges from 30° to 90°.

Specifically, the first end of the annular drive belt 13 wraps at least a part of a side wall of the brushroll 11, and the second end of the annular drive belt 13 wraps at least a part of a side wall of the motor shaft 221 of the motor 22. A surface of the drive belt 13 connected to the brushroll 11 extends axially along the brushroll 11, while a surface of the drive belt 13 connected to the motor shaft 221 of the motor 22 extends axially along the motor shaft 221. Since the axis of the motor shaft 221 of the motor 22 and that of the brushroll 11 are disposed in the non-parallel manner, the drive belt 13 between the brushroll 11 and the motor shaft 221 is twisted for one time with an angle of 30° to 90°. It shall be noted that when the drive belt 13 is annular, an upper half of the drive belt 13 and a lower half of the drive belt 13 are both twisted with the same twist angle between the brushroll 11 and the motor shaft 221 for one time.

In some other specific embodiments of the present disclosure, the drive belt 13 is winded upon the motor shaft 221 of the motor 22, the brushroll 11 and at least one guide pulley. The drive belt 13 is configured to be annular, and the surface thereof is winded upon the motor shaft 221 of the motor 22, the brushroll 11 and the at least one guide pulley. For example, if there is one guide pulley, the first end of the drive belt 13 is winded upon the motor shaft 221 of the motor 22 while the second end of the drive belt 13 is winded upon the brushroll 11, and the guide pulley is disposed between the motor 22 and the brushroll 11 and abuts against a surface of the drive belt 13 located above the guide pulley, so as to make the upper half of the drive belt 13 twist twice. Of course, the present disclosure is not limited thereby. There may be a plurality of guide pulleys to make the drive belt 13 twist a plurality of times.

Further, in this embodiment, the contact points of the drive belt 13 with the motor shaft 221 of the motor 22, the brushroll 11 and the at least one guide pulley are alterable, and the twist angle of the drive belt 13 between two adjacent alterable contact points ranges from 30° to 90°. For example, one guide pulley is disposed between the motor shaft 221 and the brushroll 11, in which the twist angle of the drive belt 13 between the alterable contact point of the drive belt 13 and the motor shaft 221 of the motor 22 and the alterable contact point of the drive belt 13 and the guide pulley is 30°, while the angle of the drive belt 13 between the alterable contact point of the drive belt 13 and the guide pulley and the alterable contact point of the drive belt 13 and the brushroll 11 is 60°.

Consequently, a direction changing motion may be realized by disposing the drive belt 13 twisted between the motor shaft 221 and the brushroll 11, to transfer the rotation of the motor shaft 221 to the rotation of the brushroll 11, so as to facilitate the transmission of motion and power; the drive belt 13 may operate more stably and reliably by winding the drive belt 13 upon the motor shaft 221, the brushroll 11 and the at least one guide pulley, to guarantee that the dust sweep and dust suction of the upright vacuum cleaner 1 are conducted synchronously.

In an example of the present disclosure, the rotating axis of the motor 22 is disposed in perpendicular to that of the brushroll 11, and the drive belt 13 is disposed at the twist angle of 90°. Referring to FIG. 4, the brushroll 11 is disposed in a horizontal plane and the rotating axis of the brushroll 11 extends along the horizontal direction; the motor 22 is disposed vertically within the motor housing 21 and the motor shaft 221 of the motor 22 is located in a vertical plane perpendicular to the rotating axis of the brushroll 11. That is, the rotating axis of the motor shaft 221 of the motor 22 and the rotating axis of the brushroll 11 are disposed in perpendicular to each other, so the upper half of the drive belt 13 and the lower half thereof are both twisted between the brushroll 11 and the motor shaft 221 for one time, and the twist angle of two ends of each section of the drive belt 13 is 90°.

Alternatively, according to an embodiment of the present disclosure, the motor shaft 221 of the motor 22 is disposed vertically. Specifically, the motor 22 mainly includes a motor body and a motor casing 222. The motor body is disposed within the motor casing 222 and is mainly constituted by a core and the motor shaft 221. The motor shaft 221 of the motor 22 is connected to the core of the motor 22, and the motor 22 is arranged vertically. When the upright vacuum cleaner 1 is in a non-working state, an upper end of the motor shaft 221 is disposed obliquely backwards relative to the vertical direction (i.e. the up-and-down direction shown in FIG. 6). During the dust suction of the upright vacuum cleaner 1, a central axis of the motor shaft 221 extends along the vertical direction. That is, the first end of the motor shaft 221 of the upright vacuum cleaner 1 may extend downwards relative to the core along the vertical direction (i.e. the up-and-down direction shown in FIG. 6). The first end of the drive belt 13 is fitted over the lower end of the motor shaft 221 and the second end of the drive belt 13 is fitted over the brushroll 11. Because the rotating axis of the brushroll 11 is disposed in the horizontal plane, the drive belt 13 is twisted at least one time between the brushroll 11 and the motor shaft 221. That is, the twist angle of the drive belt 13 between the alterable contact point of the drive belt 13 and the motor shaft 221 and the alterable contact point of the drive belt 13 and the brushroll 11 is 90°.

When the body 31 is at the upright position, the axis of the motor shaft 221 of the motor 22 is disposed obliquely backwards relative to the axis of the motor housing 21, in which case the two ends of the drive belt 13 are fitted over the motor shaft 221 and the brushroll 11 respectively, but the drive belt 13 is loosened. When the body 31 is at the oblique position, the axis of the motor 22 extends along the vertical direction. That is, the motor 22 is in an upright state, such that the drive belt 13 is tensioned. Specifically, when the body 31 is manipulated from the upright position to the oblique position, the lower end of the motor shaft 221 moves backwards gradually, to increase the distance between the lower end of the motor shaft 221 and the brushroll 11 and thus to tension the drive belt 13.

The upright vacuum cleaner 1 further includes a stopping piece disposed below the drive belt 13 and adjacent to the motor 22 to prevent the drive belt 13 from falling off from the motor shaft 221. For example, the stopping piece may be a snap spring disposed on the motor shaft 221, and the snap spring may be disposed at a free end of the motor shaft 221 to locate an end of the drive belt 13 connected to the motor shaft 221 above the snap spring, so as to avoid the drive belt 13 from sliding off from the motor shaft 221. The stopping piece may also be constituted by a structure of the free end of the motor shaft 221. Of course, the present disclosure is not limited thereby—the stopping piece may also be disposed on another part below the drive belt 13 to prevent the drive belt 13 from sliding off from the motor shaft 221. Thus, by disposing the stopping piece below the drive belt 13, it is possible to prevent the drive belt 13 from sliding off from the motor shaft 221 and guarantee a reliability of the operation of the drive belt 13, further to ensure a normal operation of the upright vacuum cleaner 1.

In some examples of the present disclosure, the second end of the drive belt 13 is fitted over the brushroll 11 and located in a middle part of the brushroll 11. The brushrolls 11 at both sides of the drive belt 13 sweeps dust respectively, and the dust and dirty air are sucked into the brushroll casing 12 from the dust suction port and then enter the dirt cup 37 for filtration. Finally, clean air is discharged from the air exhaust hole 213 of the motor housing 21. It shall be noted herein that the middle part is a relative term, and may refer to a part between the left and right ends of the brushroll 11 rather than be limited to the very central part of the brushroll 11. Specifically, the middle part may refer to a part between the very central part and the left end, or a part between the very central part and the right end.

Preferably, according to an embodiment of the present disclosure, the drive belt 13 is winded upon a very central part in a direction of the axis of the brushroll 11. Referring to FIG. 9 to FIG. 11, the second end of the drive belt 13 is fitted over the very central part in the direction of the axis of the brushroll 11. That is, the drive belt 13 divides the brushroll 11 into symmetrical left and right parts.

Figure 12:
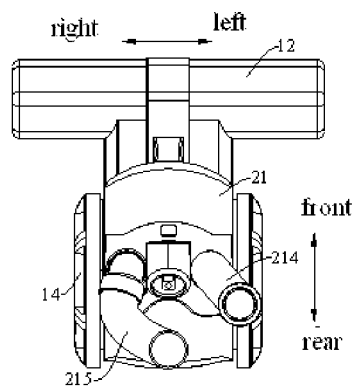
FIG. 12 is a top view of the structure shown in FIG. 11.

According to an embodiment of the present disclosure, the upright vacuum cleaner 1 further includes the brushroll casing 12 that has the brushroll air-suction channel 122 and a drive-belt mounting chamber 123 for mounting the drive belt 13. Referring to FIG. 12, the brushroll casing 12 is formed as a T shape. That is, the brushroll casing 12 includes a brush casing extending along the horizontal direction (i.e. the left-and-right direction shown in FIG. 14) and a belt casing extending along the vertical direction (i.e. the front-and-rear direction shown in FIG. 14). The brushroll casing 12 defines the drive-belt mounting chamber 123 and the brushroll air-suction channel 122 located at both sides of the drive-belt mounting chamber 123; the brushroll 11 is rotatably disposed in the brushroll air-suction channel 122 and the rotating axis of the brushroll 11 extends along a length direction of the brush casing; the drive belt 13 is rotatably disposed within the drive-belt mounting chamber 123. Further, the brushroll air-suction channel 122 and the drive belt 13 are separated. The second end of the drive belt 13 is fitted over the brushroll 11 and the first end thereof is fitted over the motor shaft 221; the drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

Figure 14:
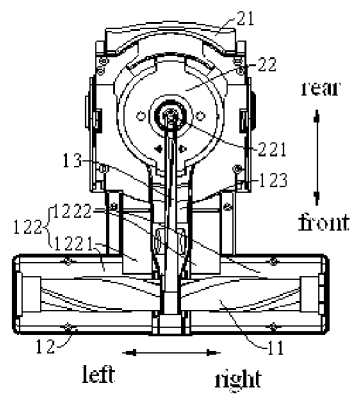
FIG. 14 is a bottom view of the structure shown in FIG. 10.
Figure 15:
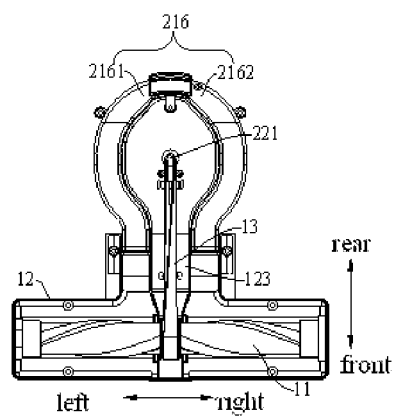
FIG. 15 is a schematic view of an internal channel of the structure shown in FIG. 14.
Figure 16:
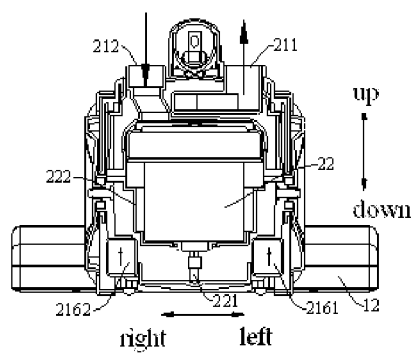
FIG. 16 is a rear view of an internal channel of the structure shown in FIG. 11.

The brushroll air-suction channel 122 includes a first air-suction channel 1221 and a second air-suction channel 1222 located at both sides of the drive-belt mounting chamber 123. Referring to FIG. 14 and FIG. 15, the first air-suction channel 1221 and the second air-suction channel 1222 are located at left and right sides of the drive belt 13 respectively, and the dirty air and dust sucked through the brushroll casing 12 are delivered to the dirt cup 37 through the first air-suction channel 1221 and the second air-suction channel 1222 respectively. The first air-suction channel 1221 and the second air-suction channel 1222 may be spaced apart and disposed at the left and right sides of the drive belt 13, such that the dirty air and dust sucked through the dust suction port of the brushroll casing 12 are delivered into the first air-suction channel 1221 and the second air-suction channel 1222 respectively, and then mixed together to flow into the dirt cup 37.

Alternatively, the first air-suction channel 1221 and the second air-suction channel 1222 may be defined by a part within the brushroll casing 12 or by an inner wall of the brushroll casing 12. Of course, the present disclosure is not limited thereby—the first air-suction channel 1221 and the second air-suction channel 1222 may be communicated with each other. That is, the space in the brushroll casing 12 belongs to the first air-suction channel 1221 and the second air-suction channel 1222, except the drive-belt mounting chamber 123, and the dirty air and dust sucked through the dust suction port of the brushroll casing 12 are delivered into the dirt cup 37 via the drive-belt mounting chamber 123. Hence, by disposing the first air-suction channel 1221 and the second air-suction channel 1222 at both sides of the drive belt 13, it is possible to achieve the effect of dust suction at both sides of the drive belt 13, so as to expand the range of dust suction and improve the working efficiency of the upright vacuum cleaner 1.

The first air-suction channel 1221 and the second air-suction channel 1222 each include a lateral air-suction channel section and a longitudinal air-suction channel section. The lateral air-suction channel section extends axially along the brushroll 11, and the longitudinal air-suction channel section extends in a direction axially perpendicular to the brushroll 11 and is communicated with the corresponding lateral air-suction channel section.

Figure 17:
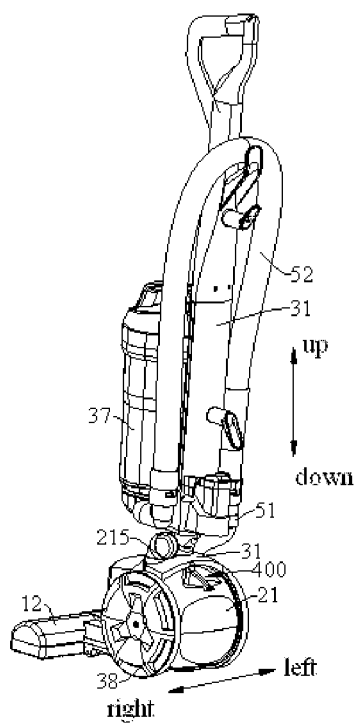
FIG. 17 is a schematic view of an upright vacuum cleaner according to another embodiment of the present disclosure.

Referring to FIG. 17, the brushroll 11 includes a first brushroll section 111 provided with bristle, a second brushroll section 112 provided with bristle, and a connecting-shaft section 113 connected between the first brushroll section 111 and the second brushroll section 112. The drive belt 13 is winded upon the motor shaft 221 of the motor 22 and the connecting-shaft section 113 to make the motor 22 drive the brushroll 11 rolling. The first air-suction channel 1221 mainly includes the lateral air-suction channel section located at a left side of the connecting-shaft section 113 and the longitudinal air-suction channel section located at a left side of the connecting-shaft section 113. The second air-suction channel 1222 mainly includes the lateral air-suction channel section located at a right side of the connecting-shaft section 113 and the longitudinal air-suction channel section located at a right side of the connecting-shaft section 113. A central line of each lateral air-suction channel section is perpendicular to a central line of each longitudinal air-suction channel section at a corresponding position.

Alternatively, the first air-suction channel 1221 and the second air-suction channel 1222 are formed as an L shape respectively and disposed in a back-to-back manner. The drive-belt mounting chamber 123 is located between the first air-suction channel 1221 and the second air-suction channel 1222. When the brushroll 11 is mounted within the brushroll casing 12, the motor 22 drives the brushroll 11 rolling by the drive belt 13 to realize the purpose of cleaning the ground. By disposing the first air-suction channel 1221 and the second air-suction channel 1222 at both sides of the drive belt 13, it is possible to achieve the effect of dust suction at both sides of the drive belt 13, so as to expand the range of dust suction and improve the working efficiency of the upright vacuum cleaner 1.

Referring to FIG. 4, the brushroll casing 12 is formed as a T shape. That is, the brushroll casing 12 includes a brush casing extending along the horizontal direction (i.e. the left-and-right direction shown in FIG. 4) and a belt casing extending along the vertical direction (i.e. the front-and-rear direction shown in FIG. 5 and FIG. 6). The brushroll casing 12 defines the drive-belt mounting chamber 123 and the brushroll air-suction channel 122 located at both sides of the drive-belt mounting chamber 123; the brushroll 11 is rotatably disposed in the brushroll air-suction channel 122 and the rotating axis of the brushroll 11 extends along a length direction of the brush casing; the drive belt 13 is rotatably disposed within the drive-belt mounting chamber 123.

The second end of the drive belt 13 is fitted over the brushroll 11 and located in the middle part of the brushroll 11. The brushrolls 11 at both sides of the drive belt 13 sweep dust respectively, and the dust and dirty air are sucked into the brushroll casing 12 from the dust suction port and then enter the dirt cup 37 for filtration. Finally, clean air is discharged from the air exhaust hole 213 of the motor housing 21. It shall be noted herein that the middle part is a relative term, and may refer to a part between the left and right ends of the brushroll 11 rather than be limited to the very central part. Specifically, the middle part may refer to a part between the very central part and the left end, or a part between the very central part and the right end.

Further, the brushroll air-suction channel 122 includes a first air-suction channel 1221 and a second air-suction channel 1222 located at both sides of the drive-belt mounting chamber 123. Referring to FIG. 14, the first air-suction channel 1221 and the second air-suction channel 1222 are located at left and right sides of the drive belt 13 respectively, and the dirty air and dust sucked through the brushroll casing 12 are delivered to the dirt cup 37 through the first air-suction channel 1221 and the second air-suction channel 1222 respectively. The first air-suction channel 1221 and the second air-suction channel 1222 may be spaced apart and disposed at the left and right sides of the drive belt 13, such that the dirty air and dust sucked through the brushroll casing 12 are delivered into the first air-suction channel 1221 and the second air-suction channel 1222 respectively, and then mixed together to flow into the dirt cup 37. Specifically, the first air-suction channel 1221 and the second air-suction channel 1222 may be defined by a part within the brushroll casing 12 or by an inner wall of the brushroll casing 12. Of course, the present disclosure is not limited thereby—the first air-suction channel 1221 and the second air-suction channel 1222 may also be communicated with each other. That is, the space in the brushroll casing 12 belongs to the first air-suction channel 1221 and the second air-suction channel 1222, except the space occupied by the drive-belt mounting chamber 123, and the dirty air and dust sucked through the dust suction port of the brushroll casing 12 are delivered into the dirt cup 37 via the drive-belt mounting chamber 123.

Therefore, by disposing the drive belt 13 between the motor 22 and the brushroll 11, the motor 22 may control the rotation of the brushroll 11 and the fan simultaneously, which utilizes fewer parts and occupies smaller space, and can realize synchronous control over dust sweep and dust suction. In addition, by disposing the first air-suction channel 1221 and the second air-suction channel 1222 at both sides of the drive belt 13 (i.e. disposing the drive belt 13 in the middle part of the brushroll 11), it is possible to achieve the effect of dust suction at both sides of the drive belt 13, so as to expand the range of dust suction and improve the working efficiency of the upright vacuum cleaner 1. The upright vacuum cleaner 1 has a simple and compact structure, so it occupies a small space and is convenient to operate, resulting in a high working efficiency.

Specifically, the first air-suction channel 1221 and the second air-suction channel 1222 are located at both sides of the drive-belt mounting chamber 123 respectively and spaced apart from the drive-belt mounting chamber 123. That is, the brushroll air-suction channel 122 is separated from the drive belt 13. The first end of the drive belt 13 is fitted over the motor shaft 221 and the second end of the drive belt 13 is fitted over the brushroll 11; the first air-suction channel 1221 and the second air-suction channel 1222 are spaced apart and disposed at the left and right sides of the drive belt 13, such that the dirty air and dust sucked through the dust suction port of the brushroll casing 12 are delivered into the first air-suction channel 1221 and the second air-suction channel 1222 respectively, and then mixed together to flow into the dirt cup 37. The drive-belt mounting chamber 123 and the brushroll air-suction channel 122 are separated to prevent the dust and debris in the brushroll air-suction channel 122 from winding upon the drive belt 13 and the motor shaft 221 and to guarantee the stability and reliability of the operation of the drive belt 13 and the motor 22, so as to ensure the normal working of the upright vacuum cleaner 1.

Preferably, an end of the drive-belt mounting chamber 123 is just opposite to the very central part in the direction of the axis of the brushroll 11. Referring to FIG. 15, the end of the drive belt 13 is fitted over the very middle part of the brushroll 11 to make two ends of the brush roller 11 be under balanced forces and ensure that the motor 22 may drive the brush roller 11 operating stably. The first air-suction channel 1221 and the second air-suction channel 1222 each include the lateral air-suction channel section and the longitudinal air-suction channel section. The lateral air-suction channel section extends axially along the brushroll 11, and the longitudinal air-suction channel section extends in the direction axially perpendicular to the brushroll 11 and is communicated with the corresponding lateral air-suction channel section.

Alternatively, the first air-suction channel 1221 and the second air-suction channel 1222 are formed as the L shape respectively and disposed in the back-to-back manner. The axis of the drive-belt mounting chamber 123 is connected to the very center of the brushroll casing 12. That is, the end of the drive belt 13 is connected to the very center of the brushroll 11. The drive-belt mounting chamber 123 is located between the first air-suction channel 1221 and the second air-suction channel 1222. When the brushroll 11 is mounted within the brushroll casing 12, the motor 22 drives the brushroll 11 rolling by the drive belt 13 to realize the purpose of cleaning the ground.

Preferably, according to an embodiment of the present disclosure, the first air-suction channel 1221 and the second air-suction channel 1222 are disposed symmetrically at both sides of the drive belt 13. That is, the first air-suction channel 1221 has the same length and the same sectional area as the second air-suction channel 1222. That is, the air suction capacities of the first air-suction channel 1221 and the second air-suction channel 1222 are equal, such that the dirty air and dust sucked via the air suction inlet enter the dirt cup 37 evenly through the first air-suction channel 1221 and the second air-suction channel 1222 to guarantee the uniformity of dust suction at both sides of the drive belt 13.

According to an embodiment of the present disclosure, the upright vacuum cleaner 1 further includes the motor housing 21 for accommodating the motor 22, and the motor housing 21 has a first branch channel 2161 communicated with the first air-suction channel 1221 and a second branch channel 2162 communicated with the second air-suction channel 1222.

In other words, the upright vacuum cleaner 1 mainly includes the brushroll 11, the motor 22, the brushroll casing 12, the dirt cup 37 and the motor housing 21. The motor housing 21 defines an accommodating chamber for mounting the motor 22 that is movably disposed in the accommodating chamber of the motor housing 21. Referring to FIG. 15, the motor housing 21 is configured as a hollow column and defines the first branch channel 2161 and the second branch channel 2162 therein that are spaced apart from each other. The motor 22 is located between the first branch channel 2161 and the second branch channel 2162, in which a first end of the first branch channel 2161 is communicated with the first air-suction channel 1221 and a first end of the second branch channel 2162 is communicated with the second air-suction channel 1222, while a second end of the first branch channel 2161 and a second end of the second branch channel 2162 are communicated with the dirt cup 37 respectively.

Alternatively, the first branch channel 2161 and the second branch channel 2162 are disposed oppositely and located at left and right sides of the drive belt 13. That is, the first air-suction channel 1221 is communicated with the first branch channel 2161 and disposed at the left side of the drive belt 13, while the second air-suction channel 1222 is communicated with the second branch channel 2162 and disposed at the right side of the drive belt 13, such that a part of dirty air and dust sucked into the brushroll casing 12 enters the dirt cup 37 sequentially through the first air-suction channel 1221 and the first branch channel 2161, while another part of the dirty air and dust enters the dirt cup 37 sequentially through the second air-suction channel 1222 and the second branch channel 2162.

Therefore, by disposing the first branch channel 2161 and the second branch channel 2162 symmetrically at both sides of the motor 22, it is possible to utilize the space between the motor housing 21 and the motor casing 222 effectively to make the internal structure compact and improve the space utilization rate; it is also possible to reduce the number of pipes to lower the cost and improve the assembling or disassembling efficiency; it is further possible to avoid the influence of external pipes during the dust suction and improve an aesthetic outlook of the upright vacuum cleaner 1.

According to an embodiment of the present disclosure, the first branch channel 2161 and the second branch channel 2162 are defined by the motor casing 222 of the motor 22 and the motor housing 21.

That is, the motor 22 is mainly constituted by the motor casing 222, the core and the motor shaft 221. The core is disposed within the motor casing 222; the first end of the motor shaft 221 is connected to the core and the second end of the motor shaft 221 is protruded beyond the motor casing 222; the motor 22 is movably disposed within the motor housing 21; an external wall of the motor casing 222 of the motor 22 is separated apart from an inner wall of the motor housing 21 to define the first branch channel 2161 and the second branch channel 2162 therebetween. That is, the first branch channel 2161 and the second branch channel 2162 are defined by the motor casing 222 of the motor 22 and the motor housing 21. Of course, the present disclosure is not limited thereby. The first branch channel 2161 and the second branch channel 2162 may also be defined by other parts (like pipes) in the motor housing 21, or by a structure of the motor housing 21.

It shall be noted that the first branch channel 2161 and the second branch channel 2162 may be configured as a space in the motor housing 21, except the motor 22. That is, the first branch channel 2161 and the second branch channel 2162 surround the circumference of the motor 22 and are communicated with each other. The first branch channel 2161 and the second branch channel 2162 may also be individual passages that are not communicated with the accommodating chamber of the motor housing 21. Of course, the present disclosure is not limited thereby. One of the first branch channel 2161 and the second branch channel 2162 may be configured to be an individual passage not in communication with the accommodating chamber of the motor housing 21, but the other of the first branch channel 2161 and the second branch channel 2162 may be configured to be the space of the accommodating chamber except the motor 22 and the other individual passage.

Preferably, according to an embodiment of the present disclosure, the first branch channel 2161 and the second branch channel 2162 together make up a stereoscopic space with a substantially annular cross section. Referring to FIG. 15, the first branch channel 2161 and the second branch channel 2162 are configured to be semi-annular and disposed in an opposite manner to define a cylindrical stereoscopic space in the motor housing 21 for mounting the motor 22. In other words, the first branch channel 2161 and the second branch channel 2162 surround the two sides of the motor 22 to utilize the space effectively and improve the space utilization rate.

Figure 7:
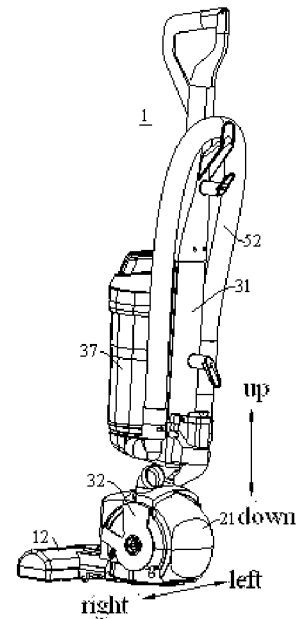
FIG. 7 is a schematic view of the upright vacuum cleaner of FIG. 4 in one direction.

According to an embodiment of the present disclosure, the motor housing 21 has the dirty air outlet 211 and the clean air inlet 212 communicated with the dirt cup 37; the first branch channel 2161 and the second branch channel 2162 are converged and then communicated to the dirty air outlet 211. Referring to FIG. 7 to FIG. 9, the dirt cup 37 is disposed above the motor housing 21. The motor housing 21 has the dirty air outlet 211 and the clean air inlet 212 spaced apart from each other. The dirty air outlet 211 is communicated with the dust suction port of the brushroll casing 12, the first air-suction channel 1221, the second air-suction channel 1222, the first branch channel 2161 and the second branch channel 2162, and may be communicated with the dirt cup 37 via a hose 52. The dirty air and dust sucked via the dust suction port enter the motor housing 21 respectively through the first air-suction channel 1221 and the second air-suction channel 1222 at two sides of the drive belt 13, then are delivered to the dirty air outlet 211 respectively through the first branch channel 2161 and the second branch channel 2162, and finally are delivered to the dirt cup 37 for filtration.

Alternatively, the dirty air outlet 211 is connected to the dirt cup 37 by an air-inlet pipe assembly to be communicated with the separating chamber 371. Specifically, as shown in FIG. 9 and FIG. 6, two ends of the air-inlet pipe assembly are communicated with the separating chamber 371 of the dirt cup 37 and the dirty air outlet 211 on the motor housing 21 respectively, such that the dirty air and dust are sucked into the brushroll air-suction channel 122 via the dust suction port of the brushroll casing 12, then into the motor air-suction channel 216 in the motor housing 21, and discharged from the dirty air outlet 211 on the motor housing 21, then discharged into the separating chamber 371 of the dirt cup 37 through the dirty air outlet 211 on the motor housing 21 for filtration. The clean air obtained enters the motor air-exhaust channel in the motor housing 21 sequentially through the air-inlet pipe assembly and the clean air inlet 212 of the motor housing 21, and finally is charged to the outside through the air exhaust hole 213 of the motor housing 21. Thus, the air-inlet pipe assembly disposed between the dirt cup 37 and the dirty air outlet 211 may serve to transmit dirty air and dust and to guarantee the communication of the air flow channels.

Alternatively, according to an embodiment of the present disclosure, the air-inlet pipe assembly includes an air-inlet pipe 51 and the hose 52. Specifically, the air-inlet pipe 51 is disposed on the motor housing 21 and defines a first end communicated with the dirty air outlet 211, and the hose 52 is connected between a second end of the air-inlet pipe 51 and an air inlet 372 of the dirt cup 37.

Referring to FIG. 8, the air-inlet pipe assembly mainly includes the air-inlet pipe 51 and the hose 52. The air-inlet pipe 51 is fixed on the motor housing 21 and the first end of the air-inlet pipe 51 is communicated with the dirty air outlet 211 on the motor housing 21 and the second end thereof is communicated with a first end of the hose 52; a second end of the hose 52 is communicated with the separating chamber 371 of the dirt cup 37. Advantageously, the length of the hose 52 may be greater than that of the body 31 to prolong the transmission time and the filtration time of the dirty air and increase the dust suction capacity, so as to improve the working efficiency of the upright vacuum cleaner 1. Further, a middle part of the hose 52 may be hanged on the body 31 to make the structure compact. Alternatively, the hose 52 may be a plastic hose 52 or a rubber hose 52, so as to facilitate coiling up the hose 52 to save space and improve the space utilization rate.

In some other specific embodiments of the present disclosure, the hose 52 is detachably connected between the second end of the air-inlet pipe 51 and the air inlet 372 of the dirt cup 37. That is, the first end of the hose 52 may be detached from the second end of the air-inlet pipe 51 according to practical requirements. In this embodiment, the upright vacuum cleaner 1 may suck dust directly through the hose 52 without using the brushroll 11. Thus, the upright vacuum cleaner 1 has a simple and compact structure and is convenient to assemble or disassemble. It is possible to choose an appropriate vacuuming mode according to practical working conditions, which is easy to operate.

According to an embodiment of the present disclosure, the body 31 defines a body air-exhaust channel 311 therein. A first end of the body air-exhaust channel 311 is connected to an air outlet 373 of the dirt cup 37 and communicated to the separating chamber 371, and a second end of the body air-exhaust channel 311 is communicated with the clean air inlet 212.

Referring to FIG. 9, the dirt cup 37 has the air outlet 373 communicated with the separating chamber 371, and the body 31 defines the body air-exhaust channel 311 extending along a length direction of the body 31. An upper end of the body air-exhaust channel 311 is communicated with the air outlet 373 of the dirt cup 37 and a lower end thereof is communicated with the motor air-exhaust channel in the motor housing 21. The clean air obtained after filtration and processing of the dirt cup 37 is discharged from the air outlet 373 of the dirt cup 37, transmitted to the motor air-exhaust channel in the motor housing 21 sequentially through the body air-exhaust channel 311 and the clean air inlet 212 of the motor housing 21, and finally discharged to the outside from the air exhaust hole 213 of the motor housing 21.

Accordingly, by disposing the body air-exhaust channel 311 communicated with the air outlet 373 of the dirt cup 37 and the clean air inlet 212 respectively in the body 31, it is possible to omit the arrangement of redundant pipes, which not only reduces the parts of the upright vacuum cleaner 1 to save the cost and improve the efficiency of assembling or disassembling the upright vacuum cleaner 1, but also makes the structure of the upright vacuum cleaner 1 simple and compact to avoid the influence of external pipes and create an aesthetic outlook.

Further, the second end (i.e. the lower end shown in FIG. 9) of the body air-exhaust channel 311 is communicated with the clean air inlet 212 through an air exhaust pipe 39. Specifically, the motor 22 is disposed below the body 31; the air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curve pipe extending from an outlet of the body air-exhaust channel 311 to the clean air inlet 212.

Preferably, according to an embodiment of the present disclosure, the dirty air outlet 211 and the clean air inlet 212 are disposed symmetrically with respect to a central axis of the motor housing 21. Referring to FIG. 10, the dirty air outlet 211 and the clean air inlet 212 are spaced apart and disposed at left and right sides of the central axis of the motor housing 21, to make good use of the external wall of the motor housing 21 and facilitate the connection with external pipes, which forms a reasonable and compact layout.

According to an embodiment of the present disclosure, the dirty air outlet 211 is connected to the dirt cup 37 by an air-inlet pipe assembly to be communicated with the separating chamber 371. Specifically, as shown in FIG. 9, two ends of the air-inlet pipe assembly are communicated with the separating chamber 371 of the dirt cup 37 and the dirty air outlet 211 on the motor housing 21 respectively, such that the dirty air and dust are sucked into the brushroll air-suction channel 122 via the dust suction port of the brushroll casing 12, then into the motor air-suction channel 216 in the motor housing 21, and discharged from the dirty air outlet 211 on the motor housing 21, then discharged into the separating chamber 371 of the dirt cup 37 through the dirty air outlet 211 on the motor housing 21 for filtration. The clean air obtained enters the motor air-exhaust channel in the motor housing 21 sequentially through the body air-exhaust channel 311, the air exhaust pipe 39 and the clean air inlet 212, and finally is charged to the outside through the air exhaust hole 213 of the motor housing 21. Thus, the air-inlet pipe assembly disposed between the dirt cup 37 and the dirty air outlet 211 may not only serve to transmit dirty air and dust to guarantee the communication of the air flow channels, but also prolong the separation time of the dust to improve the dust suction effect of the upright vacuum cleaner 1.

Alternatively, according to an embodiment of the present disclosure, the air-inlet pipe assembly includes the air-inlet pipe 51 and the hose 52. Specifically, the air-inlet pipe 51 is disposed on the motor housing 21 and defines the first end communicated with the dirty air outlet 211, and the hose 52 is connected between the second end of the air-inlet pipe 51 and the air inlet 372 of the dirt cup 37.

Referring to FIG. 8, the air-inlet pipe assembly mainly includes the air-inlet pipe 51 and the hose 52. The air-inlet pipe 51 is fixed on the motor housing 21 and the first end of the air-inlet pipe 51 is communicated with the dirty air outlet 211 on the motor housing 21 and the second end thereof is communicated with the first end of the hose 52; the second end of the hose 52 is communicated with the separating chamber 371 of the dirt cup 37. Advantageously, the length of the hose 52 may be greater than that of the body 31 to prolong the separation time and the filtration time of the dust and dirty air and increase the dust suction capacity, so as to improve the working efficiency of the upright vacuum cleaner 1. Further, the middle part of the hose 52 may be hanged on the body 31 to make the structure compact. Alternatively, the hose 52 may be the plastic hose 52 or the rubber hose 52, so as to facilitate coiling up the hose 52 to save space and improve the space utilization rate.

In some other specific embodiments of the present disclosure, the hose 52 is detachably connected between the second end of the air-inlet pipe 51 and the air inlet 372 of the dirt cup 37. That is, the first end of the hose 52 may be detached from the second end of the air-inlet pipe 51 according to practical requirements. In other words, the upright vacuum cleaner 1 may suck dust directly through the hose 52 without using the brushroll 11. Thus, the upright vacuum cleaner 1 has a simple and compact structure and is convenient to assemble or disassemble. It is possible for users to choose an appropriate vacuuming mode according to practical working conditions, which provides good user experience and a high working efficiency with easy operations.

According to an embodiment of the present disclosure, the body 31 defines a body air-exhaust channel 311 therein. The first end of the body air-exhaust channel 311 is connected to an air outlet 373 of the dirt cup 37 and communicated to the separating chamber 371, and the second end of the body air-exhaust channel 311 is communicated with the clean air inlet 212.

Referring to FIG. 9, the dirt cup 37 has the air outlet 373 communicated with the separating chamber 371, and the body 31 defines the body air-exhaust channel 311 extending along the length direction of the body 31. The upper end of the body air-exhaust channel 311 is communicated with the air outlet 373 of the dirt cup 37 and the lower end thereof is communicated with the motor air-exhaust channel in the motor housing 21. The clean air obtained after filtration and processing of the dirt cup 37 is discharged from the air outlet 373 of the dirt cup 37, transmitted to the motor air-exhaust channel in the motor housing 21 sequentially through the body air-exhaust channel 311 and the clean air inlet 212 of the motor housing 21, and finally discharged to the outside from the air exhaust hole 213 of the motor housing 21.

Accordingly, by disposing the body air-exhaust channel 311 communicated with the air outlet 373 of the dirt cup 37 and the clean air inlet 212 respectively in the body 31, it is possible to omit the arrangement of redundant pipes, which not only reduces the parts of the upright vacuum cleaner 1 to save the cost and improve the efficiency of assembling or disassembling the upright vacuum cleaner 1, but also makes the structure of the upright vacuum cleaner 1 simple and compact to avoid the influence of external pipes and create the aesthetic outlook.

Further, the second end of the body air-exhaust channel 311 (i.e. the lower end shown in FIG. 9) is communicated with the clean air inlet 212 via the air exhaust pipe 39. Specifically, the motor 22 is disposed below the body 31; the air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21. Alternatively, the air exhaust pipe 39 may be configured as a straight pipe or a curve pipe extending from an outlet of the body air-exhaust channel 311 to the clean air inlet 212.

Alternatively, the motor 22 drives the brushroll 11 rolling by the drive belt 13, and the brushroll air-suction channel 122 includes the first air-suction channel 1221 and the second air-suction channel 1222 located at both sides of the drive belt 13. Referring to FIG. 14, the brushroll casing 12 defines the brushroll air-suction channel 122 and the drive-belt mounting chamber 123 for mounting the drive belt 13; the brushroll air-suction channel 122 mainly includes the first air-suction channel 1221 and the second air-suction channel 1222 located at left and right sides of the drive belt 13. The dirty air sucked through the brushroll casing 12 is transmitted to the motor air-suction channel 216 in the motor housing 21 through the first air-suction channel 1221 and the second air-suction channel 1222, and then to the dirt cup 37 by the air-inlet pipe assembly for filtration.

The first air-suction channel 1221 and the second air-suction channel 1222 may be spaced apart and disposed at the left and right sides of the drive-belt mounting chamber 123, such that the dirty air and dust sucked through the dust suction port of the brushroll casing 12 are delivered into the first air-suction channel 1221 and the second air-suction channel 1222 respectively, and then mixed together to flow into the dirt cup 37. Alternatively, the first air-suction channel 1221 and the second air-suction channel 1222 may be defined by the part disposed in the brushroll casing 12 or by the inner wall of the brushroll casing 12. Of course, the present disclosure is not limited thereby—the first air-suction channel 1221 and the second air-suction channel 1222 may also be communicated with each other. That is, the first air-suction channel 1221 and the second air-suction channel 1222 surround the drive belt 13, the space in the brushroll casing 12 belongs to the first air-suction channel 1221 and the second air-suction channel 1222, except the drive-belt mounting chamber 123, and the dirty air and dust sucked through the brushroll casing 12 are delivered into the dirt cup 37 via the drive-belt mounting chamber 123. Hence, by disposing the first air-suction channel 1221 and the second air-suction channel 1222 at both sides of the drive belt 13, it is possible to achieve the effect of dust suction at both sides of the drive belt 13, so as to expand the range of dust suction and improve the working efficiency of the upright vacuum cleaner 1.

Preferably, according to an embodiment of the present disclosure, the first air-suction channel 1221 and the second air-suction channel 1222 are disposed symmetrically with respect to the drive belt 13. That is, the first air-suction channel 1221 has the same length and the same sectional area as the second air-suction channel 1222. That is, the air suction capacities of the first air-suction channel 1221 and the second air-suction channel 1222 are equal, such that the dirty air and dust sucked via the air suction inlet enter the dirt cup 37 evenly through the first air-suction channel 1221 and the second air-suction channel 1222 to guarantee the uniformity of dust suction at both sides of the drive belt 13.

According to an embodiment of the present disclosure, the motor air-suction channel 216 includes the first branch channel 2161 communicated with the first air-suction channel 1221 and the second branch channel 2162 communicated with the second air-suction channel 1222. Referring to FIG. 15, the motor housing 21 is configured as the hollow column and defines the first branch channel 2161 and the second branch channel 2162 therein that are spaced apart from each other. The motor 22 is located between the first branch channel 2161 and the second branch channel 2162, in which the first end of the first branch channel 2161 is communicated with the first air-suction channel 1221 and the first end of the second branch channel 2162 is communicated with the second air-suction channel 1222, while the second end of the first branch channel 2161 and the second end of the second branch channel 2162 are communicated with the dirt cup 37 respectively.

Alternatively, the first branch channel 2161 and the second branch channel 2162 are disposed oppositely and located at left and right sides of the drive belt 13. That is, the first air-suction channel 1221 is communicated with the first branch channel 2161 and disposed at the left side of the drive belt 13, while the second air-suction channel 1222 is communicated with the second branch channel 2162 and disposed at the right side of the drive belt 13, such that a part of dirty air and dust sucked into the mounting chamber of the brushroll 11 from the dust suction port enters the dirt cup 37 sequentially through the first air-suction channel 1221 and the first branch channel 2161, while another part of the dirty air and dust enters the dirt cup 37 sequentially through the second air-suction channel 1222 and the second branch channel 2162.

Therefore, by disposing the first branch channel 2161 and the second branch channel 2162 at both sides of the motor 22, it is possible to utilize the space between the motor housing 21 and the motor casing 222 effectively to make the internal structure compact and improve the space utilization rate; it is also possible to reduce the number of pipes to lower the cost and improve the assembling or disassembling efficiency; it is further possible to avoid the influence of external pipes during the dust suction and create the aesthetic outlook of the upright vacuum cleaner 1.

The first branch channel 2161 and the second branch channel 2162 are defined by the motor casing 222 of the motor 22 and the motor housing 21, and together make up the stereoscopic space with the substantially annular cross section. That is, the motor 22 is mainly constituted by the motor casing 222 and the motor body. The motor body is disposed within the motor casing 222 and is mainly constituted by the core and the motor shaft 221; the first end of the motor shaft 221 is connected to the core and the second end of the motor shaft 221 is protruded beyond the motor casing 222; the motor 22 is movably disposed within the motor housing 21; the external wall of the motor casing 222 of the motor 22 is separated apart from the inner wall of the motor housing 21 to define the first branch channel 2161 and the second branch channel 2162 therebetween. That is, the first branch channel 2161 and the second branch channel 2162 are defined by the motor casing 222 of the motor 22 and the motor housing 21. Of course, the present disclosure is not limited thereby. The first branch channel 2161 and the second branch channel 2162 may also be defined by other parts (like pipes) in the motor housing 21, or by the structure of the motor housing 21.

It shall be noted that the first branch channel 2161 and the second branch channel 2162 may be configured to be the space in the motor housing 21, except the motor 22 and the motor air-exhaust channel. That is, the first branch channel 2161 and the second branch channel 2162 surround the circumference of the motor 22 and are communicated with each other. The first branch channel 2161 and the second branch channel 2162 may also be individual passages that are not communicated with the accommodating chamber of the motor housing 21. Of course, the present disclosure is not limited thereby. One of the first branch channel 2161 and the second branch channel 2162 may be configured to be the individual passage not in communication with the accommodating chamber of the motor housing 21, but the other of the first branch channel 2161 and the second branch channel 2162 may be configured to be the space of the accommodating chamber except the motor 22 and the other individual passage. Preferably, the first branch channel 2161 and the second branch channel 2162 are configured to be semi-annular and disposed in the opposite manner to define the cylindrical stereoscopic space in the motor housing 21 for mounting the motor 22. In other words, the first branch channel 2161 and the second branch channel 2162 surround the two sides of the motor 22 to utilize the space effectively and improve the space utilization rate.

Further, the upright vacuum cleaner includes two wheels 38. The two wheels 38 are disposed at two sides of the motor housing 21 and rotatably connected to the motor housing 21. Thus, when the user pushes a handle on the body 31, two wheels 38 rotate together, and drive the body assembly 300 and a brushroll assembly 100 moving forwards, so as to save efforts during the dust suction. Alternatively, a rotating axis of the wheel 38 is parallel to the rotating axis of the brushroll 11. For example, in this embodiment, the rotating axes of the two wheels 38 and the rotating axis of the brushroll 11 all extend along the horizontal direction, and the brushroll 11 sweeps the ground when the two wheels 38 roll forwards together, which may guarantee the stable and reliable operation and the aesthetic outlook in accordance with human visual aesthetics. Further, the body assembly 300 includes the body 31 and the bridging member 32 mounted on the body 31. The bridging member 32 includes a top plate 321 and two side plates 322 connected at both sides of the top plate 321. The two side plates 322 are clamped between two side walls of the motor housing 21 and the corresponding wheels 38 respectively and are rotatably connected to the motor housing 21.

Referring to FIG. 8, the body assembly 300 mainly includes the body 31, the bridging member 32 and the dirt cup 37. The dirt cup 37 may be detachably disposed on the body 31 and defines a separating chamber 371 therein, and the separating chamber 371 is communicated with the dirty air outlet 211 and the clean air inlet 212 on the motor housing 21 respectively. Specifically, dirty air and dust are introduced into the brushroll air-suction channel 122 via the dust suction port of the brushroll casing 12, then into the motor air-suction channel 216 in the motor housing 21, and discharged into the separating chamber 371 of the dirt cup 37 via the dirty air outlet 211 on the motor housing 21; clean air through filtration and processing of the dirt cup 37 enters the motor air-exhaust channel within the motor housing 21 via the clean air inlet 212 on the motor housing 21 and is discharged to the outside via the air exhaust hole 213 on the motor housing 21.

The bridging member 32 mainly includes the top plate 321 and two side plates 322, in which the two side plates 322 extend downwards along the vertical direction respectively. Upper ends of the two side plates 322 are fixed and connected to left and right ends of the top plate 321 respectively. When the motor housing 21, the bridging member 32 and the two wheels 38 are assembled, the bridging member 32 and the motor housing 21 are rotatably connected, and the two side plates 322 of the bridging member 32 are located between the wheel 38 at the corresponding position and the side wall of the motor housing 21 respectively. The bridging member 32 is rotatable with respect to the motor housing 21 and the wheels 38.

Therefore, in the upright vacuum cleaner 1 according to the present disclosure, the motor air-suction channel 216 and the motor air-exhaust channel are disposed in the motor housing 21 to facilitate the transmission of dirty air and clean air, which may not only utilize the space in the motor housing 21 effectively to improve the space utilization rate, but also reduce the number of pipes to save the cost and improve the efficiency of assembling or disassembling the upright vacuum cleaner 1 at the same time of guaranteeing the compact structure and aesthetic outlook of the upright vacuum cleaner 1. Additionally, the motor of the upright vacuum cleaner 1 is disposed vertically to reduce the occupation space of the upright vacuum cleaner 1 and facilitate diverse arrangements of various parts of the upright vacuum cleaner 1. In one word, the upright vacuum cleaner 1 has the simple and compact structure and is easy to assemble and disassemble with a high working efficiency.

Figure 53:
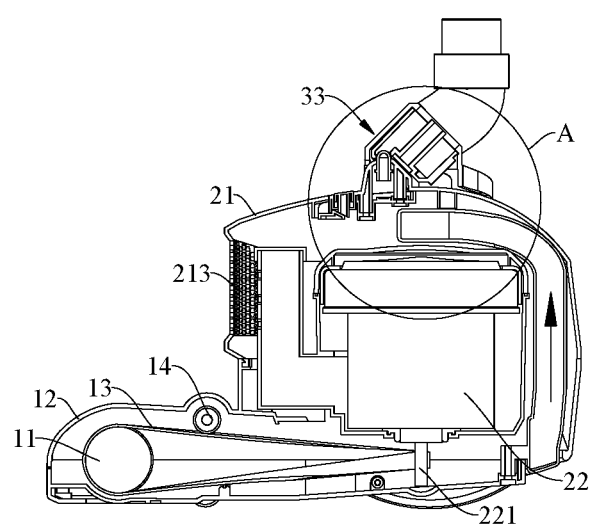
FIG. 53 is an assembly drawing of a motor assembly and a brushroll assembly of an upright vacuum cleaner according to an embodiment of the present disclosure.
Figure 54:
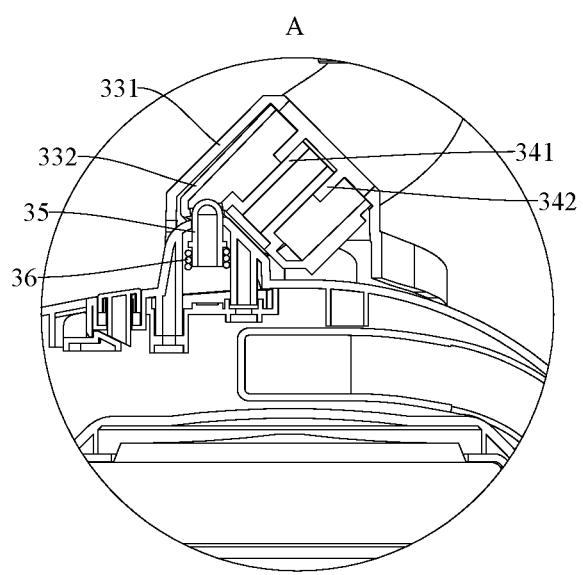
FIG. 54 is an enlarged view of part A of FIG. 53.

According to an embodiment of the present disclosure, the body 31 and the bridging member 32 are connected to each other by a connecting pipe assembly 33. Referring to FIG. 53 and FIG. 54, the motor 22 is disposed below the body 31 and the motor housing 21 is connected to the lower end of the body 31. The bridging member 32 is rotatably connected to the motor housing 21, and the top plate 321 of the bridging member 32 is connected to the lower end of the body 31 by the connecting pipe assembly 33.

Alternatively, the connecting pipe assembly 33 includes a first connecting pipe 331 and a second connecting pipe 332. Specifically, the first connecting pipe 331 is disposed on the top plate 321 of the bridging member 32 while the second connecting pipe 332 is disposed on the lower end of the body 31, in which the first connecting pipe 331 is fitted over the second connecting pipe 332.

That is, the connecting pipe assembly 33 mainly includes the first connecting pipe 331 and the second connecting pipe 332, in which the first connecting pipe 331 is connected to the top plate 321 of the bridging member 32; the second connecting pipe 332 is connected to the lower end of the body 31; the second connecting pipe 332 is inserted into the first connecting pipe 331 and is detachably connected to the first connecting pipe 331.

Further, the body 31 and the bridging member 32 are positioned and cooperated with each other by a positioning assembly 34, so as to guarantee mounting the first connecting pipe 331 and the second connecting pipe 332 accurately by positioning. Alternatively, according to an embodiment of the present disclosure, the positioning assembly 34 includes a first positioning piece 341 and a second positioning piece 342. Specifically, the first positioning piece 341 is disposed on the top plate 321 of the bridging member 32, and the second positioning piece 342 is disposed on the lower end of the body 31. One of the first positioning piece 341 and the second positioning piece 342 is a positioning column, and the other is a positioning cartridge.

In other words, the positioning assembly 34 mainly includes the first positioning piece 341 and the second positioning piece 342. Referring to FIG. 53, the first positioning piece 341 is disposed within the first connecting pipe 331 and is configured as the positioning column that extends axially along the first connecting pipe 331; the second positioning piece 342 is disposed on the lower end of the body 31 and is configured as the positioning cartridge cooperating with the positioning column; after the first connecting pipe 331 and the second connecting pipe 332 are assembled, the positioning column is inserted in the positioning cartridge. Thus, it is possible to mount the first connecting pipe 331 and the second connecting pipe 332 accurately.

The upright vacuum cleaner 1 further includes a limiting column 35 that is disposed on the motor housing 21 movably in the up-and-down direction. When the body 31 is at the upright position, the limiting column 35 is inserted into the bridging member 32 to limit and cooperate with the bridging member 32. When the body 31 moves from the upright position to the oblique position, the limiting column 35 is detached from the bridging member 32.

Referring to FIG. 53, the limiting column 35 is disposed on the top of the motor housing 21 and is movable in the up-and-down direction. When the upright vacuum cleaner 1 is in the working state, i.e. the body 31 is at the second oblique position, the limiting column 35 is located outside of the connecting pipe assembly 33, and abuts against with the external wall of the connecting pipe assembly 33 to guarantee the body 31 remaining the oblique state during work, such that the motor 22 may drive the rotation of the brushroll 11 to improve the reliability and continuity of the operation of the upright vacuum cleaner 1. When the upright vacuum cleaner 1 is in the non-working state, i.e. the body 31 at the second upright position, the limiting column 35 is inserted into the connecting pipe assembly 33 to guarantee the body 31 remaining the upright state when the body 31 is unused. Thus, the limiting column 35 disposed on the motor housing 21 may serve for limiting positions with a simple, stable and reliable structure which occupies small space.

The upright vacuum cleaner 1 further includes the elastic member 36 that is connected between the limiting column 35 and the motor housing 21 to make the limiting column 35 move up and down. Therefore, the elastic member 36 disposed on the limiting column 35 may serve as a cushion to avoid collision during the rotation of the body 31, so as to guarantee the stability and reliability of the swing of the body 31.

As shown in FIG. 53, in this embodiment, the top plate 321 of the bridging member 32 is provided with the first connecting pipe 331 that is internally provided with the positioning column; the lower end of the body 31 is provided with the second connecting pipe 332 that is internally provided with the positioning cartridge. After the second connecting pipe 332 is inserted into the first connecting pipe 331, the positioning cartridge is fitted over the positioning column.

Specifically, the first connecting pipe 331 is connected to the top plate 321 of the bridging member 32 and is internally provided with the first positioning piece 341 that is configured as the positioning column that extends axially along the first connecting pipe 331; the second connecting pipe 332 is connected to the lower end of the body 31 and is internally provided with the second positioning piece 342 that configured as the positioning cartridge cooperating with the positioning column. After the first connecting pipe 331 and the second connecting pipe 332 are assembled, the positioning column is inserted into the positioning cartridge, so as to mount the bridging member 32 and the body 31 accurately and guarantee the reliability of the connection therebetween.

Further, the motor housing 21 is provided with the limiting column 35 movable in the up-and-down direction. When the body 31 is in the upright state, the limiting column 35 passes through a bottom wall of a support sleeve and is inserted into the support sleeve to cooperate with the support sleeve for limitation. When the body 31 moves from the upright state to the oblique state, the limiting column 35 is detached from the support sleeve. Thus, it is convenient to mount the bridging member 32 and the motor housing 21, further to improve the reliability and accuracy of the connection therebetween.

The clutching device 400 of the upright vacuum cleaner 1 according to many embodiments of the present disclosure will be described with reference to FIG. 17 to FIG. 51.

Embodiment 1

Figure 18:
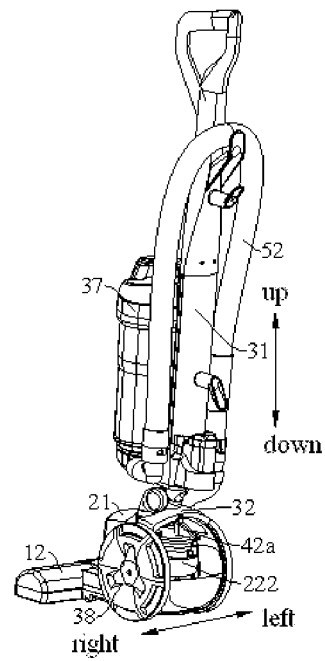
FIG. 18 is a partial assembly drawing of the upright vacuum cleaner of FIG. 17.
Figure 19:
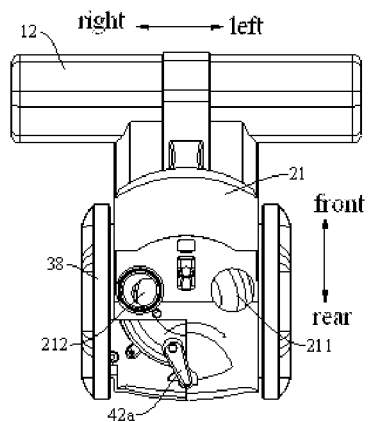
FIG. 19 is a partial assembly drawing of the upright vacuum cleaner of FIG. 17 in a working state.
Figure 20:
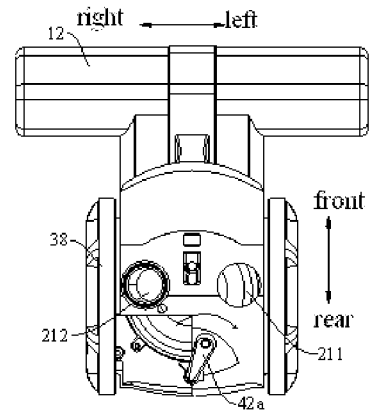
FIG. 20 is a partial assembly drawing of the upright vacuum cleaner of FIG. 17 in another working state.

As shown from FIG. 17 to FIG. 23, the clutching device 400 of the upright vacuum cleaner 1 according to the embodiments of the present disclosure is disposed between the motor assembly 200 and the body assembly 300 of the upright vacuum cleaner 1. The motor assembly 200 includes the motor housing 21 and the motor 22 disposed in the motor housing 21. Referring to FIG. 17 and FIG. 18, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected to the motor 22 and the brushroll 11 respectively. The motor 22 drives the brushroll 11 by the drive belt 13.

The body assembly 300 includes the body 31 and the bridging member 32 mounted on the body 31, in which the bridging member 32 is rotatably connected to the motor housing 21. Referring to FIG. 17, the body assembly 300 mainly includes the body 31 and the bridging member 32. The body 31 is arranged along the vertical direction, and the bridging member 32 is disposed below the body 31 and connected to the lower end of the body 31. The bridging member 32 is mounted on the motor housing 21 and may pivot relative to the motor housing 21. When the handle of the body 31 is manipulated, for example, moving the body 31 from the second upright position to the second oblique position, the bridging member 32 rotates with respect to the motor housing 21 to push the motor 22 from the first oblique position to the first upright position.

Further, the clutching device 400 includes a slide chute 41a and a triggering member 42a. The slide chute 41a is formed in the bridging member 32, and the triggering member 42a is rotatably supported on the motor housing 21 and defines a first end with a sliding column 4211a slidably cooperating with the slide chute 41a and a second end having a toggling rod 4221a adapted for stirring the movement of the motor 22. When the bridging member 32 drives the movement of the slide chute 41a, the sliding column 4211a slides along the slide chute 41a to make the triggering member 42a rotate; and the toggling rod 4221a stirs the rotation of the motor 22 relative to the motor housing 21 when the triggering member 42a rotates.

Referring to FIG. 19 to FIG. 22, the clutching device 400 mainly includes the slide chute 41a and the triggering member 42a. The slide chute 41a is disposed at a side of the bridging member 32 opposite to the motor housing 21, and the triggering member 42a is rotatably supported on the motor housing 21. The first end of the triggering member 42a cooperates with the slide chute 41a of the bridging member 32, and the second end thereof passes through the motor housing 21 and cooperates with the motor casing 222 of the motor 22.

Specifically, the sliding column 4211a is disposed on the first end of the triggering member 42a, such that the triggering member 42a cooperates with the slide chute 41a of the bridging member 32 by the sliding column 4211a; the toggling rod 4221a is disposed on the second end of the triggering member 42a, such that the triggering member 42a cooperates with the motor casing 222 by the toggling rod 4221a. Specifically, when the body is manually turned from the second upright position to the second oblique position, the bridging member 32 on the motor housing 21 rotates with respect to the motor housing 21 and the bridging member 32 drives the rotation of the triggering member 42a with respect to the motor housing 21. The toggling rod 4221a on the second end of the triggering member 42a causes the motor 22 to rotate from the first oblique position to the first upright position. In this process, the lower end of the motor shaft 221 moves backwards gradually, so as to increase the distance between the lower end of the motor shaft 221 and the brushroll 11, so as to tension the drive belt 13 to implement the operations of dust sweep and dust suction.

Consequently, the clutching device 400 of the upright vacuum cleaner 1 according to the embodiments of the present disclosure has a simple structure and is easy to manufacture and process. Since the triggering member 42a of the clutching device 400 is rotatably disposed on the motor housing 21, and two ends of the triggering member 42a cooperate with the bridging member 32 and the motor 22 respectively, it is possible to make the motor 22 to rotate, so as to adjust the degree of tightness of the drive belt 13 to guarantee the normal working of dust sweep and dust suction. Moreover, it is easy to assemble or disassemble the clutching device 400 that guarantees the stable and reliable operation with a high working efficiency.

According to an embodiment of the present disclosure, the triggering member 42a includes a first triggering part 421a, a second triggering part 422a and a pivot section 423a. Specifically, the sliding column 4211a is formed on the first triggering part 421a; the toggling rod 4221a is formed on the second triggering part 422a; the pivot section 423a is connected between the first triggering part 421a and the second triggering part 422a, and rotatably passes through the motor housing 21. That is, the triggering member 42a mainly includes the first triggering part 421a, the second triggering part 422a and the pivot section 423a. The two ends of the pivot section 423a are connected to the first triggering part 421a and the second triggering part 422a respectively. A free end of the first triggering part 421a is provided with the sliding column 4211a in cooperation with the bridging member 32, and a free end of the second triggering part 422a is provided with the toggling rod 4221a in cooperation with the motor casing 222.

Figure 21:
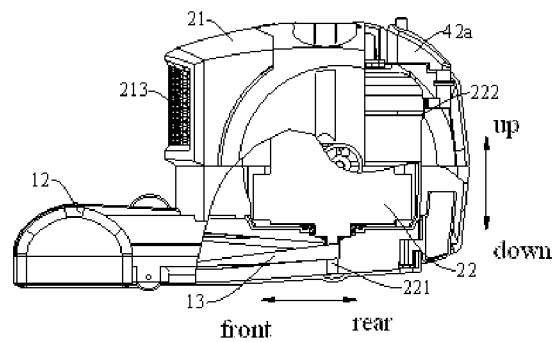
FIG. 21 is a side view of the structure shown in FIG. 19.

Referring to FIG. 21, the triggering member 42a is rotatably disposed on the top wall of the motor housing 21. Specifically, the pivot section 423a passes through the top wall of the motor housing 21; the first triggering part 421a is connected to an upper end of the pivot section 423a and located above the top wall of the motor housing 21, while the second triggering part 422a is connected to a lower end of the pivot section 423a and located below the top wall of the motor housing 21. When the body 31 is turned manually from the second upright position to the second oblique position, the bridging member 32 on the motor housing 21 rotates clockwise relative to the motor housing 21 and drives the sliding column 4211a of the triggering member 42a sliding in the slide chute 41a to make the triggering member 42a rotate around its rotating axis. Then the toggling rod 4221a stirs the rotation of the motor 22 from the first oblique position to the first upright position. In this process, the lower end of the motor shaft 221 moves backwards gradually, which increases the distance between the lower end of the motor shaft 221 and the brushroll 11, so as to tension the drive belt 13 to implement the operations of dust sweep and dust suction.

In some specific embodiments of the present disclosure, the pivot section 423a is disposed vertically, and the first triggering part 421a is disposed perpendicular to the pivot section 423a. The vertical height of the first triggering part 421a is decreased gradually along a direction from a first end of the first triggering part 421 adjacent to the sliding column 4211a to a second end thereof adjacent to the pivot section 423a. Specifically, the pivot section 423a is configured as a column extending along the vertical direction (i.e. the up-and-down direction shown in FIG. 21). The second end of the first triggering part 421a is connected to the upper end of the pivot section 423a, and the first end thereof extends along a direction perpendicular to the axis of the pivot section 423a. The first end of the second triggering part 422a is connected to the lower end of the pivot section 423a, and the second end thereof extends along a direction perpendicular to the axis of the pivot section 423a. The first triggering part 421a and the second triggering part 422a may rotate around the central axis of the pivot section 423a, i.e. rotatable in the horizontal plane respectively. Further, the sliding column 4211a is disposed at the free end of the first triggering part 421a and extends along the vertical direction; the vertical height of the first triggering part 421a is increased gradually along a direction from the central axis of the pivot section 423a to the central axis of the sliding column 4211a.

Figures 22, 23:
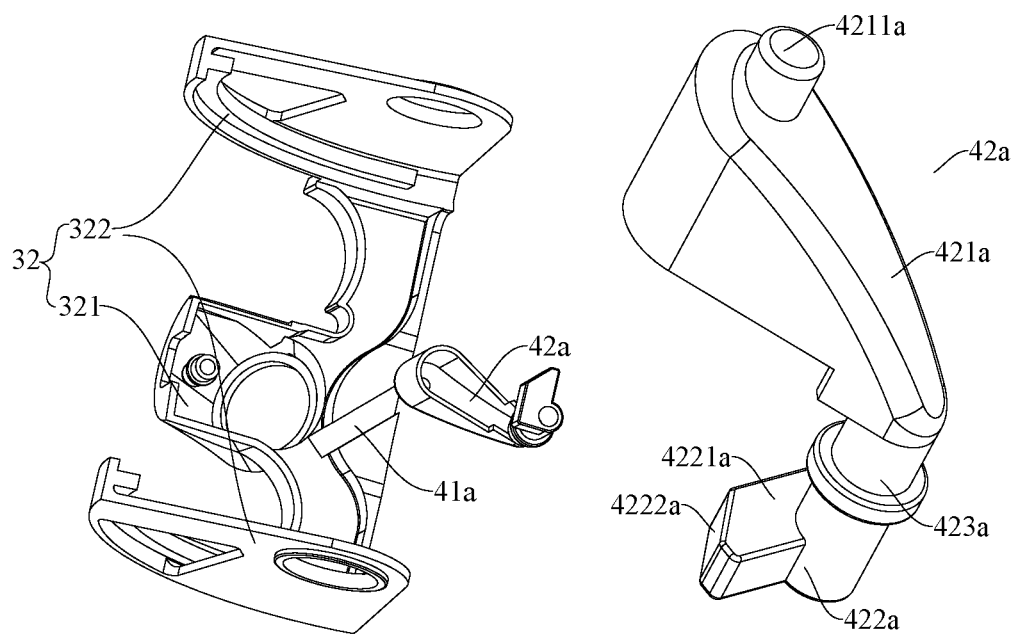
FIG. 22 is an assembly drawing of a bridging member and a triggering member of an upright vacuum cleaner according to an embodiment of the present disclosure.
FIG. 23 is a schematic view of a triggering member of an upright vacuum cleaner according to an embodiment of the present disclosure.

As shown in FIG. 23, an upper surface of the first triggering part 421a is configured as an arc surface corresponding to the shape of the bridging member 32. Thus, it is possible to avoid the top wall of the bridging member 32 by configuring the upper surface of the first triggering part 421a as the arc surface, which may guarantee the compact structure, and avoid collision between the upper surface of the first triggering part 421a and the top wall of the bridging member 32 to guarantee continuity and reliability of transmitting motion and power.

According to an embodiment of the present disclosure, the motor housing 21 is formed with an accommodating space for accommodating the first triggering part 421a and for rotation of the first triggering part 421a. Referring to FIG. 17, the top wall of the motor housing 21 is provided with the accommodating space for mounting the first triggering part 421a; the pivot section 423a of the triggering member 42a is rotatably connected to the bottom wall of the accommodating space; and the first triggering part 421a of the triggering member 42a may rotate in the accommodating space. Hence, the operation of the triggering member 42a may be benefited by disposing the accommodating space for accommodating the first triggering part 421a on the motor housing 21.

In addition, the first triggering part 421a and the pivot section 423a are detachably connected. In the process of assembling the clutching device 400 with the body assembly 300 and the motor assembly 200, the second triggering part 422a and the pivot section 423a of the triggering member 42a may be mounted in the motor housing 21 first, and make the second triggering part 422a cooperate with the motor casing 222; then the first triggering part 421a is connected to the pivot section 423a from the outside of the motor housing 21 to realize the assembling of the triggering member 42a and the motor housing 21. Therefore, since the first triggering part 421a and the pivot section 423a are detachably connected, it is convenient to assemble or disassemble the triggering member 42a and the motor housing 21 due to the simple structure, which is easy to manufacture and process.

Alternatively, the pivot section 423a is disposed vertically; the first triggering part 421a and the toggling rod 4221a are disposed in perpendicular to the pivot section 423a respectively, in which an angle between an extension direction of length of the toggling rod 4221a and an extension direction of length of the first triggering part 421a ranges from 0° to 90°. Thus, it is possible to realize the purpose that the bridging member 32 drives the rotation of the triggering member 42a, while the triggering member 42a realizes the rotation of the motor 22, and to guarantee continuity and reliability of transmitting motion and power. Further, the toggling rod 4221a includes an oblique surface 4222a for pushing the motor casing 222 at an end of the toggling rod 4221a, which facilitates pushing the motor 22 by the toggling rod 4221a.

Alternatively, according to an embodiment of the present disclosure, the slide chute 41a is linear and extends obliquely with respect to the front-and-rear direction. Referring to FIG. 22, an internal surface of the top plate 321 of the bridging member 32 is provided with a linear slide chute 41a disposed obliquely with respect to the symmetric axis of the bridging member 32. When the bridging member 32 rotates, the linear slide chute 41a of the bridging member 32 cooperates with the sliding column 4211a of the triggering member 42a, such that the bridging member 32 drives the rotation of the triggering member 42a around its rotating axis and then the toggling rod 4221a causes the motor 22 to rotate from the first oblique position to the first upright position. In some specific embodiments of the present disclosure, the triggering member 42a is rotatably supported on the longitudinal central line of the motor housing 21 to guarantee sufficient space for rotation of the triggering member 42a, so as to improve the driving power to stir the motor 22.

Embodiment 2

As shown in FIGS. 24 to 31, the upright vacuum cleaner 1 according to the embodiments of the present disclosure includes the brushroll 11, the motor assembly 200, the body assembly 300 and a lever cam member 41b. Specifically, the motor assembly 200 includes the motor housing 21 and the motor 22 disposed in the motor housing 21. The motor 22 drives the brushroll 11 rolling by the drive belt 13 and is rotatable between the first upright position of tensioning the drive belt 13 and the first oblique position of loosening the drive belt 13.

In other words, the upright vacuum cleaner 1 mainly includes the brushroll 11, the motor assembly 200, the body assembly 300 and the lever cam member 41b, in which the motor assembly 200 is connected to the brushroll 11, the body assembly 300 and the lever cam member 41b respectively. Referring to FIG. 24, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected to the motor 22 and the brushroll 11 respectively. The motor 22 drives the brushroll 11 by the drive belt 13.

The body assembly 300 includes the body 31 and the bridging member 32 mounted on the body 31, in which the bridging member 32 is rotatably connected to the motor housing 21 to make the body 31 rotatable between the second upright position and the second oblique position. Referring to FIG. 24, the body assembly 300 mainly includes the body 31 and the bridging member 32. The body 31 is arranged along the vertical direction, and the bridging member 32 is disposed below the body 31 and connected to the lower end of the body 31. The bridging member 32 is mounted on the motor housing 21 and may pivot relative to the motor housing 21. When the handle of the body 31 is manipulated, for example, moving the body 31 from the second upright position to the second oblique position, the bridging member 32 rotates with respect to the motor housing 21 to push the motor 22 from the first oblique position to the first upright position.

Figure 27:
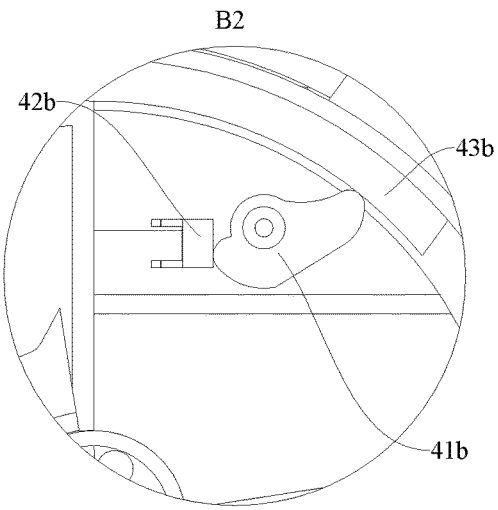
FIG. 27 is an enlarged view of part B2 of FIG. 26.

Further, the lever cam member 41b is rotatably disposed on the motor housing 21 and two ends of the lever cam member 41b cooperate with the bridging member 32 and the motor 22 respectively. When the body 31 moves from the second upright position to the second oblique position, the bridging member 32 causes the motor 22 to move from the first oblique position to the first upright position by the lever cam member 41b. Referring to FIG. 24 and FIG. 27, the lever cam member 41b is connected to the bridging member 32 and the motor casing 222 of the motor 22 respectively. When the body 31 is located at the second upright position, the axis of the motor shaft 221 of the motor 22 is disposed obliquely backwards with respect to the axis of the motor housing 21. That is, the motor 22 is at the first oblique position. In such a case, two ends of the drive belt 13 are fitted over the brushroll 11 and the motor shaft 221 respectively, but the drive belt 13 is in the loosening state. When the body 31 is located at the second oblique position, the axis of the motor 22 extends along the vertical direction. That is, the motor 22 is at the first upright position, in which case the drive belt 13 is tensioned.

Specifically, when the body 31 is turned manually from the second upright position to the second oblique position, the bridging member 32 on the motor housing 21 rotates relative to the motor housing 21 and causes the motor 22 to rotate from the first oblique position to the first upright position by the lever cam member 41b. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

In this embodiment, when the body 31 is manipulated from the second upright position to the second oblique position at the predetermined angle, the motor 22 may rotate synchronously along with the body 31. When the motor 22 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

Consequently, in the upright vacuum cleaner 1 according to the embodiments of the present disclosure, since the lever cam member 41b is disposed on the motor housing 21 and two ends of the lever cam member 41b cooperate with the bridging member 32 and the motor 22 respectively, it is achievable to realize the rotation of the motor 22 and adjust the tension degree of the drive belt 13, so as to guarantee the normal working of dust sweep and dust suction. Moreover, the upright vacuum cleaner 1 is easy to assemble and disassemble, and may operate stably and reliably with a high working efficiency. Additionally, the motor 22 of the upright vacuum cleaner 1 is disposed vertically to reduce the occupation space of the upright vacuum cleaner and facilitate diverse arrangements of various parts of the upright vacuum cleaner 1.

Figure 28:
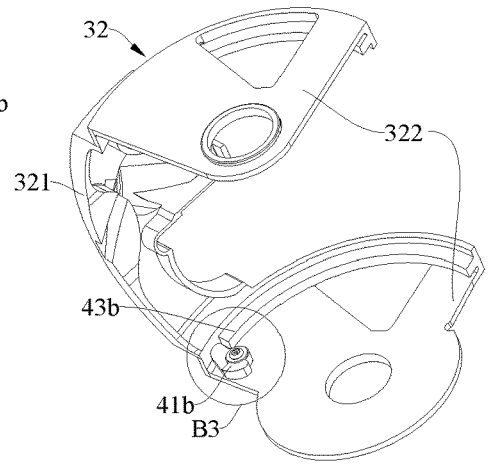
FIG. 28 is an assembly drawing of a bridging member and a lever cam member of the upright vacuum cleaner of FIG. 24.
Figure 29:
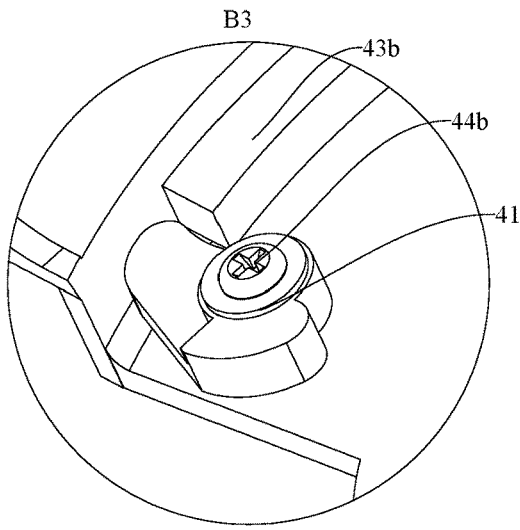
FIG. 29 is an enlarged view of part B3 of FIG. 28.
Figure 30:
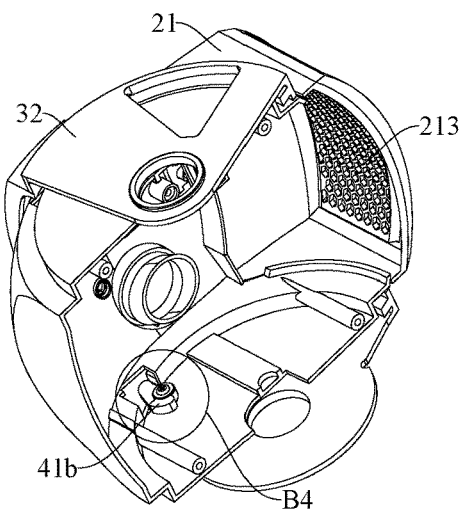
FIG. 30 is an assembly drawing of a motor housing and a lever cam member of the upright vacuum cleaner of FIG. 24.
Figure 31:
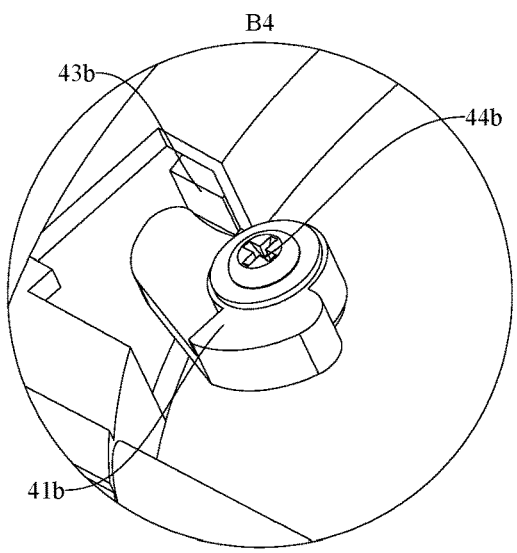
FIG. 31 is an enlarged view of part B4 of FIG. 30.

There are two lever cam members 41b that are symmetrically disposed on two side walls of the motor housing 21. Referring to FIG. 28 and FIG. 30, the two lever cam members 41b are spaced apart and disposed on opposite inner side walls of the motor housing 21 respectively, each lever cam member 41b is rotatable in the corresponding vertical plane, and the two lever cam members 41b rotate around the same rotating axis.

According to an embodiment of the present disclosure, the lever cam member 41b includes a rotary joint 411b, a first toggling part 412b and a second toggling part 413b. Specifically, the rotary joint 411b is rotatably connected to the motor housing 21; the first toggling part 412b and the second toggling part 413b are disposed at two sides of a same axial section of the rotary joint 411b respectively and extend towards a first direction and a second direction away from each other, the first toggling part 412b in cooperation with the motor 22, and the second toggling part 413b in cooperation with the bridging member 32.

In other words, the lever cam member 41b mainly includes the rotary joint 411b, the first toggling part 412b and the second toggling part 413b. The first toggling part 412b and the second toggling part 413b are disposed at two sides of the rotary joint 411b respectively, and connected to the opposite side walls of the rotary joint 411b respectively. The rotary joint 411b of the lever cam member 41b is rotatably disposed on the motor housing 21; the first toggling part 412b of the lever cam member 41b cooperates with the motor casing 222 of the motor 22, and the second toggling part 413b of the lever cam member 41b cooperates with the inner wall of the bridging member 32. When the body 31 is turned manually from the second upright position to the second oblique position, the bridging member 32 on the motor housing 21 rotates relative to the motor housing 21 and drives the rotation of the lever cam member 41b around its rotating axis by driving the second toggling part 413b, and then the first toggling part 412b of the lever cam member 41b pushes the motor 22 rotating from the first oblique position to the first upright position. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

Alternatively, the maximum distance between the second toggling part 413b and the center of the rotary joint 411b is greater than the maximum distance between the first toggling part 412b and the center of the rotary joint 411b. That is, the distance between a free end of the second toggling part 413b and a rotating center of the lever cam member 41b is greater than the distance between a free end of the first toggling part 412b and the rotating center of the lever cam member 41b. When the bridging member 32 rotates, the free end of the second toggling part 413b abuts against and is connected to the bridging member 32, so as to drive the lever cam member 41b rotating around the center of the rotary joint 411b. Thus, it is attainable that the first toggling part 412b makes the rotation of the motor 22 from the first oblique position to the first upright position, thereby tensioning the drive belt 13. The widths of the first toggling part 412b and the second toggling part 413b are both decreased gradually along a first direction and a second direction away from the rotary joint 411b, and the contours of the respective free ends of the first toggling part 412b and the second toggling part 413b are configured to be arc. Thus, it is convenient that the first toggling part 412b and the second toggling part 413b cooperate with the motor 22 and the bridging member 32 respectively, so as to guarantee the stable and reliable operation.

Further, one of the motor housing 21 and the rotary joint 411b is provided with a first rotating shaft 44b, and the other thereof is provided with a first rotational axle hole in cooperation with the first rotating shaft 44b. Referring to FIG. 30, the opposite inner side walls of the motor housing 21 are provided with the first rotational shaft 44b respectively, while the rotary joint 411b of the lever cam member 41b is provided with the first rotational axle hole in cooperation with the first rotational shaft 44b, so as to connect the lever cam member 41b with the motor housing 21 rotatably through a simple structure which has low cost and is easy to assemble or disassemble.

According to an embodiment of the present disclosure, the motor 22 is provided with a first toggling block 42b in cooperation with the first toggling part 412b. Alternatively, the first toggling block 42b is configured to be a rectangular block in the vertical plane; there are two first toggling blocks 42b disposed on left and right side walls of the motor casing 222 of the motor 22; the first toggling parts 412b of two lever cam member 41b abut against and are connected to the first toggling blocks 42b at corresponding positions respectively. Advantageously, according to an embodiment of the present disclosure, the lever cam member 41b is provided with a retaining groove 414b; when the motor 22 is at the first oblique position, the first toggling blocks 42b cooperates in the retaining groove 414b. Referring to FIG. 25, FIG. 27 and FIG. 37, the retaining groove 414b is disposed at a side of the first toggling parts 412b of the lever cam member 41b facing the first toggling block 42b, and an end of the first toggling blocks 42b cooperates with the retaining groove 414b. Therefore, by disposing the retaining groove 414b on the lever cam member 41b, it is advantageous for the first toggling part 412b of the lever cam member 41b to drive the first toggling block 42b, which may guarantee the reliable connection between the lever cam member 41b and the motor 22, so as to further improve the reliability of using the upright vacuum cleaner 1.

According to an embodiment of the present disclosure, the bridging member 32 is provided with a second toggling block 43b in cooperation with the second toggling part 413b. Referring to FIG. 28, the toggling block 43b is fixed on the opposite inner side walls of the bridging member 32, and the second toggling parts 413b of two lever cam members 41b abut against and are connected to the second toggling blocks 43b at corresponding positions, such that the bridging member 32 pushes the rotation of the lever cam member 41b to make the motor 22 rotate from the first oblique position to the first upright position, so as to tension the drive belt 13. Alternatively, the second toggling block 43b is configured as an arc block, and extends along the circumference of the rotary joint 411b to guarantee the reliable connection between the bridging member 32 and the second toggling blocks 43b.

Embodiment 3

As shown in FIGS. 32 to 36, the upright vacuum cleaner 1 according to the embodiments of the present disclosure includes the brushroll 11, the motor assembly 200, the body assembly 300 and a lever cam member 41c. Specifically, the motor assembly 200 includes the motor housing 21 and the motor 22 disposed in the motor housing 21. The motor 22 drives the brushroll 11 rolling by the drive belt 13 and is rotatable between the first upright position of tensioning the drive belt 13 and the first oblique position of loosening the drive belt 13.

Figure 32:
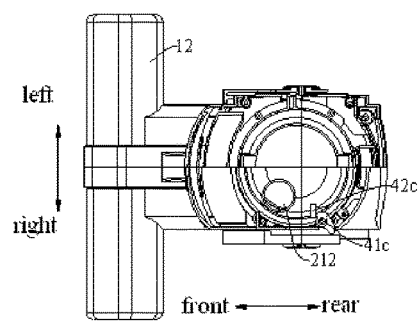
FIG. 32 is a partial assembly drawing of an upright vacuum cleaner according to another embodiment of the present disclosure.

In other words, the upright vacuum cleaner 1 mainly includes the brushroll 11, the motor assembly 200, the body assembly 300 and the lever cam member 41c, in which the motor assembly 200 is connected to the brushroll 11, the body assembly 300 and the lever cam member 41c respectively. Referring to FIG. 32, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected to the motor 22 and the brushroll 11 respectively. The motor 22 drives the brushroll 11 by the drive belt 13.

The body assembly 300 includes the body 31 and the bridging member 32 mounted on the body 31, in which the bridging member 32 is rotatably connected to the motor housing 21 to make the body 31 rotatable between the second upright position and the second oblique position. Referring to FIG. 32, the body assembly 300 mainly includes the body 31 and the bridging member 32. The body 31 is arranged along the vertical direction, and the bridging member 32 is disposed below the body 31 and connected to the lower end of the body 31. The bridging member 32 is mounted on the motor housing 21 and may pivot relative to the motor housing 21. When the handle of the body 31 is manipulated, for example, moving the body 31 from the second upright position to the second oblique position, the bridging member 32 rotates with respect to the motor housing 21 to push the motor 22 from the first oblique position to the first upright position.

Further, the lever cam member 41c is rotatably disposed on the motor housing 21 by a first rotating shaft 44c and two ends of the lever cam member 41c cooperate with the bridging member 32 and the motor 22 respectively. When the body 31 moves from the second upright position to the second oblique position, the bridging member 32 causes the motor 22 to move from the first oblique position to the first upright position by the lever cam member 41c. Referring to FIG. 32, the lever cam member 41c is connected to the bridging member 32 and the motor casing 222 of the motor 22 respectively. When the body 31 is located at the second upright position, the axis of the motor shaft 221 of the motor 22 is disposed obliquely backwards with respect to the axis of the motor housing 21. That is, the motor 22 is at the first oblique position. In such a case, two ends of the drive belt 13 are fitted over the brushroll 11 and the motor shaft 221 respectively, but the drive belt 13 is in the loosening state. When the body 31 is located at the second oblique position, the axis of the motor 22 extends along the vertical direction. That is, the motor 22 is at the first upright position, in which case the drive belt 13 is tensioned.

Specifically, when the body 31 is turned manually from the second upright position to the second oblique position, the bridging member 32 on the motor housing 21 rotates relative to the motor housing 21 and causes the motor 22 to rotate from the first oblique position to the first upright position by the lever cam member 41c. In this process, a lower end of the motor shaft 221 is moved backwards gradually, to increase the distance between the lower end of the motor shaft 221 and the brushroll 11, so as to tension the drive belt 13 to implement the operations of dust sweep and dust suction.

In this embodiment, when the body 31 is manipulated from the second upright position to the second oblique position at the predetermined angle, the motor 22 may rotate synchronously along with the body 31. When the body 31 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

Consequently, in the upright vacuum cleaner 1 according to the embodiments of the present disclosure, since the lever cam member 41c is disposed on the motor housing 21 and two ends of the lever cam member 41c cooperate with the bridging member 32 and the motor 22 respectively, it is achievable to realize the rotation of the motor 22 and adjust the tension degree of the drive belt 13, so as to guarantee the normal working of dust sweep and dust suction. Moreover, the upright vacuum cleaner 1 is easy to assemble and disassemble, and may operate stably and reliably with a high working efficiency. Additionally, the motor 22 of the upright vacuum cleaner 1 is disposed vertically to reduce the occupation space of the upright vacuum cleaner and facilitate diverse arrangements of various parts of the upright vacuum cleaner 1.

There are two lever cam members 41c that are spaced apart and disposed on the top wall of the motor housing 21. Referring to FIG. 33 and FIG. 35, the first toggling block 42c is fixed on the top wall of the motor casing 222 of the motor 22; the second toggling block 43c is fixed on a side wall of the bridging member 32 opposite to the motor housing 21; the lever cam member 41c is rotatably disposed on the top wall of the motor housing 21 and located between the first toggling block 42c and the second toggling block 43c; the first toggling part 412c of the lever cam member 41c and the first toggling block 42c cooperate with each other, while the second toggling part 413c of the lever cam member 41c and the second toggling block 43c cooperate with each other. When the body 31 is turned manually from the second upright position to the second oblique position, the bridging member 32 on the motor housing 21 rotates clockwise relative to the motor housing 21, and the second toggling block 43c on the bridging member 32 moves backwards relative to the lever cam member 41c to push the second toggling part 413c of the lever cam member 41c, such that the lever cam member 41c rotates counterclockwise in the horizontal plane. Meanwhile, the first toggling part 412c of the lever cam member 41c pushes the first toggling block 42c forwards to make the motor 22 rotate from the first oblique position to the first upright position. In this process, the lower end of the motor shaft 221 moves backwards gradually, which increases the distance between the lower end of the motor shaft 221 and the brushroll 11, so as to tension the drive belt 13 to implement the operations of dust sweep and dust suction.

Alternatively, according to an embodiment of the present disclosure, the lever cam member 41c is rotatably connected to the inner top wall of the motor housing 21, and the second toggling part 413c of the lever cam member 41c passes through the side wall of the motor housing 21. Referring to FIG. 35 and FIG. 36, the lever cam member 41c is rotatably disposed at the inner surface of the top wall of the motor housing 21 and adjacent to the side wall of the motor housing 21. The motor 22 is located below the lever cam member 41c; the first toggling block 42c on the motor casing 222 of the motor 22 is disposed opposite the first toggling part 412c of the lever cam member 41c to make the first toggling part 412c clamped in the retaining groove 414c of the lever cam member 41c, while the second toggling part 413c of the lever cam member 41c passes through the side wall of the motor housing 21 and cooperates with the second toggling block 43c on the bridging member 32.

Therefore, by disposing two lever cam members 41c on the top wall of the motor housing 21, it is possible to provide sufficient power to move the motor 22 with balanced forces, and to guarantee the stability of the structure to improve the reliability of using the upright vacuum cleaner 1. Of course, the present disclosure is not limited thereby. There may be one or more lever cam members 41c; the lever cam member 41c may be arranged at other positions except the top wall and side wall of the motor housing 21; and the first toggling block 42c and the second toggling block 43c may be formed as another structure that cooperates with two ends of the lever cam member 41c respectively.

Embodiment 4

Figure 39:
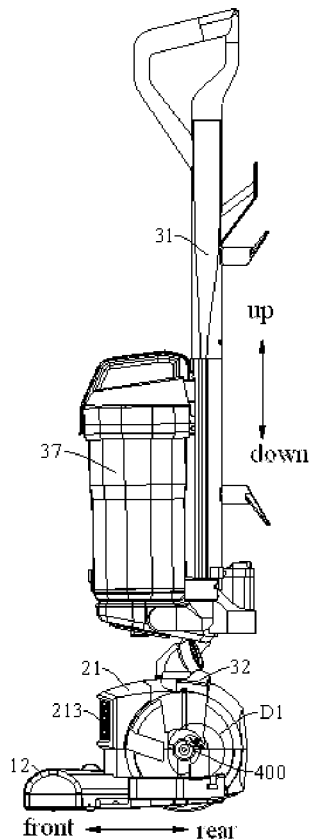
FIG. 39 is a schematic view of an upright vacuum cleaner when a body is located at a second upright position according to an embodiment of the present disclosure.
Figure 41:
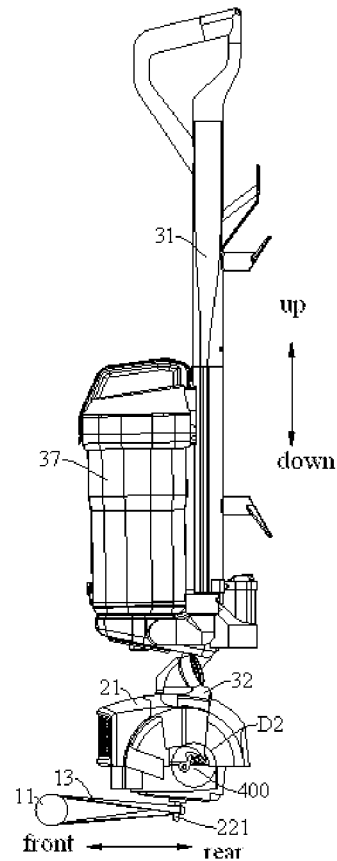
FIG. 41 is a partial assembly drawing of the upright vacuum cleaner of FIG. 39.
Figure 42:
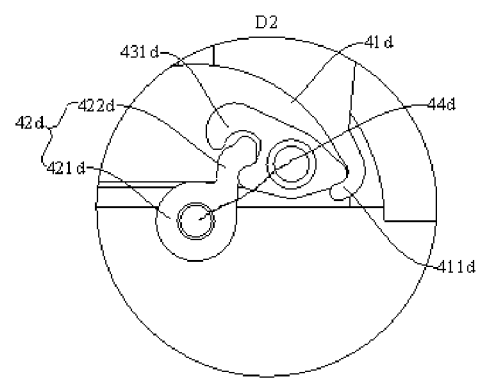
FIG. 42 is an enlarged view of part D2 of FIG. 41.
Figure 43:
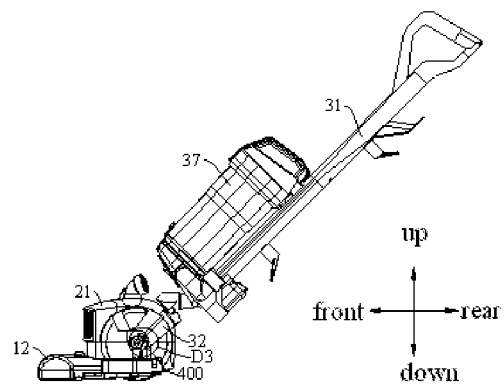
FIG. 43 is a schematic view of an upright vacuum cleaner when a body is located at a second oblique position according to an embodiment of the present disclosure.

As shown in FIGS. 39 to 46, the clutching device 400 of the upright vacuum cleaner 1 according to the embodiments of the present disclosure is disposed between the motor assembly 200 and the body assembly 300 of the upright vacuum cleaner 1. The motor assembly 200 includes the motor housing 21 and the motor 22 disposed in the motor housing 21. Referring to FIG. 39 and FIG. 43, the motor assembly 200 mainly includes the motor 22 and the motor housing 21. The motor housing 21 defines the accommodating chamber for mounting the motor 22 that is movably disposed in the accommodating chamber and may pivot relative to the motor housing 21. The motor 22 may drive the rotation of the fan to generate the dust suction flow to provide the vacuuming power for the upright vacuum cleaner 1. The motor 22 may further drive the brushroll 11 rotating around its own axis to achieve the purpose of cleaning the ground. Specifically, the drive belt 13 is disposed between the motor 22 and the brushroll 11 and is connected to the motor 22 and the brushroll 11 respectively. The motor 22 drives the brushroll 11 by the drive belt 13. The body assembly 300 includes the body 31 and the bridging member 32 mounted on the body 31, and the bridging member 32 is rotatably connected to the motor housing 21 to make the body 31 rotatable between the second upright position and the second oblique position.

Further, the clutching device 400 includes the second sliding rail 41d, a toggling tongue 42d and a lever member 43d. Specifically, the second sliding rail 41d is driven by the body assembly 300; the toggling tongue 42d is fixed on the motor 22 and rotatable relative to the motor housing 21; a first end of the lever member 43d slidably cooperates with the second sliding rail 41d and a second end thereof cooperates with an end of the toggling tongue 42d. Referring to FIG. 41 and FIG. 42, the clutching device 400 is disposed between the motor assembly 200 and the body assembly 300, and is movably connected to the motor assembly 200 and the body assembly 300 respectively; the lever member 43d of the clutching device 400 is rotatably disposed on the motor housing 21 while the second sliding rail 41d of the clutching device 400 is disposed on the body assembly 300; the toggling tongue 42d is fixed on the motor casing 222 of the motor 22; and the first end of the lever member 43d cooperates with the toggling tongue 42d and the second end thereof cooperates with the second sliding rail 41d.

When the body assembly 300 drives the second sliding rail 41d moving, the second sliding rail 41d drives the rotation of the lever member 43d; when the lever member 43d rotates, the toggling tongue 42d is stirred to make the motor 22 rotate with respect to the motor housing 21. Specifically, when the body 31 is manipulated from the upright position to the oblique position (i.e. inclining backwards as shown in FIG. 43), the bridging member 32 on the motor housing 21 rotates clockwise relative to the motor housing 21, and hence the second sliding rail 41d on the bridging member 32 rotates clockwise relative to the lever member 43d. Since the second sliding rail 41d keeps cooperation with the second end of the lever member 43d, in this process, the lever member 43d rotates clockwise around its rotational center, which makes it possible that the lever member 43d drives the toggling tongue 42d counterclockwise rotating around a pivotal axis, thereby making the motor 22 to rotate from the oblique state to the upright state. In this process, the lower end of the motor shaft 221 moves backwards gradually, which increases the distance between the lower end of the motor shaft 221 and the brushroll 11 so as to tension the drive belt 13.

Therefore, the clutching device 400 of the upright vacuum cleaner 1 according to the embodiments of the present disclosure is easy to manufacture and process with low cost due to the simple structure. Since the lever member 43d of the clutching device 400 is rotatably disposed on the motor housing 21, and two ends of the lever member 43d cooperate with the bridging member 32 and the motor 22 respectively, it is possible to move the motor 22, so as to adjust the degree of tightness of the drive belt 13 to guarantee the normal working of dust sweep and dust suction. Moreover, it is easy to assemble or disassemble the clutching device 400 that guarantees the stable and reliable operation with a high working efficiency.

Figure 40:
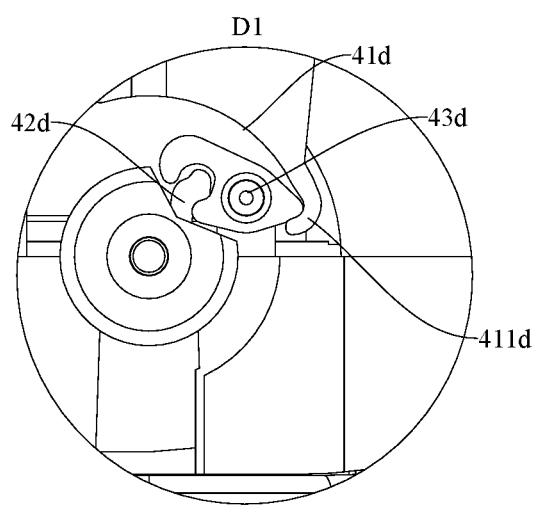
FIG. 40 is an enlarged view of part D1 of FIG. 39.
Figure 44:
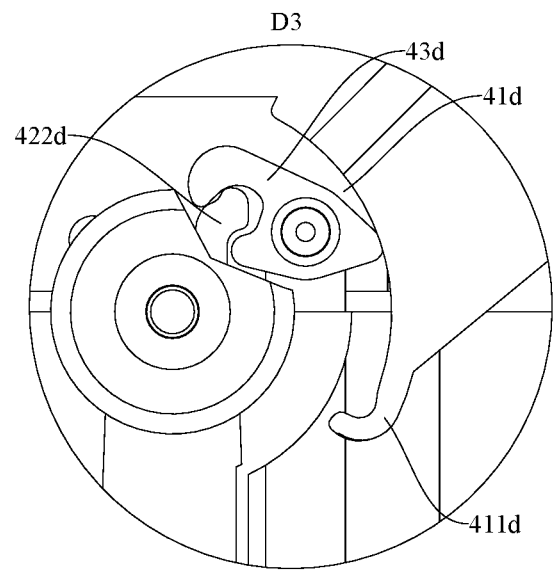
FIG. 44 is an enlarged view of part D3 of FIG. 43.

Advantageously, a stopping block 411d is disposed at a lower end of the second sliding rail 41d to prevent the first end of the lever member 43d from slipping off from the lower end of the second sliding rail 41d. Referring to FIG. 40 and FIG. 44, the second end of the lever member 43 is movably disposed in the second sliding rail 41d, and the lower end of the second sliding rail 41d is provided with the stopping block 411d extending inwards along the radial direction of the second sliding rail 41d. When the second end of the lever member 43 slides to the end part of the sliding groove, the lever member 43 abuts against and is connected to the stopping block 411d. Consequently, the stopping block 411d disposed at the lower end of the second sliding rail 41d may prevent the second end of the lever member 43d from slipping off from the second sliding rail 41d, which guarantees the reliable connection with the triggering assembly and further improves the reliability of using the upright vacuum cleaner 1. Preferably, the stopping block 411d may be disposed at the two ends of the second sliding rail 41d respectively to prevent the second end of the lever member 43d from slipping off from two ends of the second sliding rail 41d.

The second sliding rail 41d extends along a curve line. In other words, the second sliding rail 41d is a curve second sliding rail 41d, and the second end of the lever member 43d slides reciprocally along the arc of the second sliding rail 41d, such that the bridging member 32 may drive the rotation of the lever member 43d and the lever member 43d may makes the rotation of the motor 22. Preferably, the second sliding rail 41d extends along the arc line with the rotating axis of the body assembly 300 as the central axis. Referring to FIG. 42, the contour of the second sliding rail 41d is configured to be an arc shape extending circumferentially along the rotational center of the lever member 43d. When the bridging member 32 of the body assembly 300 rotates around its rotational center, the second end of the lever member 43d is maintained in the second sliding rail 41d. Hence, the bridging member 32 drives the rotation of the lever member 43d around its rotational center by the second sliding rail 41d thereon to make the first end of the lever member 43d drive the toggling tongue 42d to realize the purpose of realizing the rotation of the motor 22.

Figure 45:
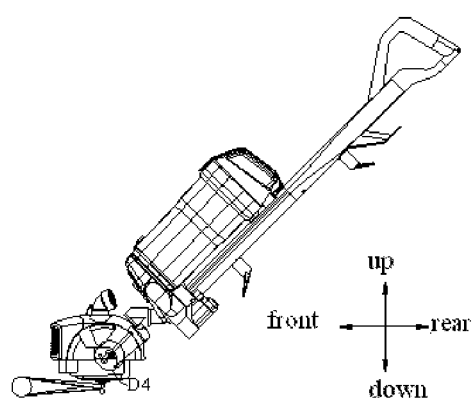
FIG. 45 is a partial assembly drawing of the upright vacuum cleaner of FIG. 43.
Figure 46:
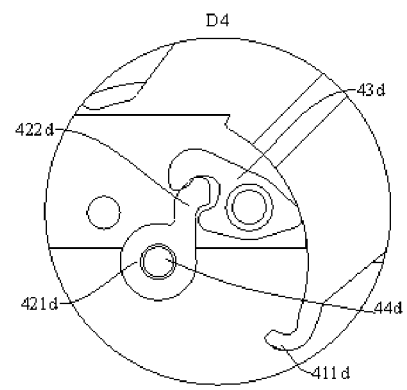
FIG. 46 is an enlarged view of part D4 of FIG. 45.
Figure 47:
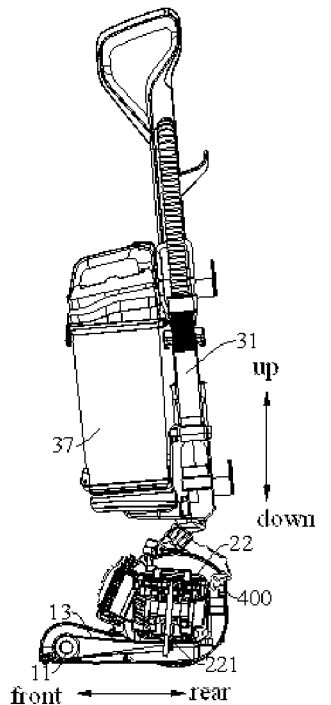
FIG. 47 is a side view of an upright vacuum cleaner when a motor is located at a first oblique position according to an embodiment of the present disclosure.
Figure 49:
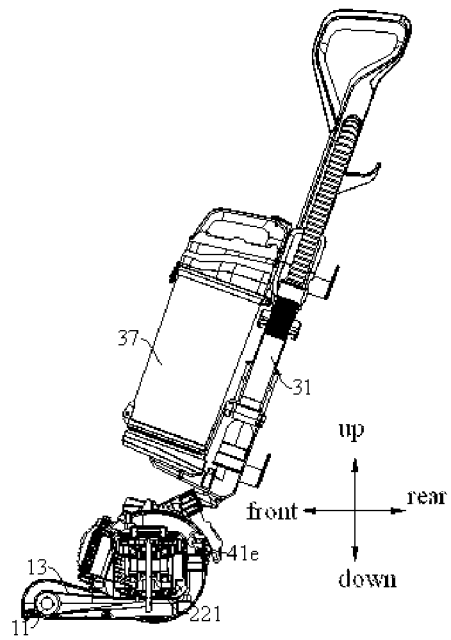
FIG. 49 is a side view of an upright vacuum cleaner when a motor is located at a first upright position according to an embodiment of the present disclosure.
Figure 48:
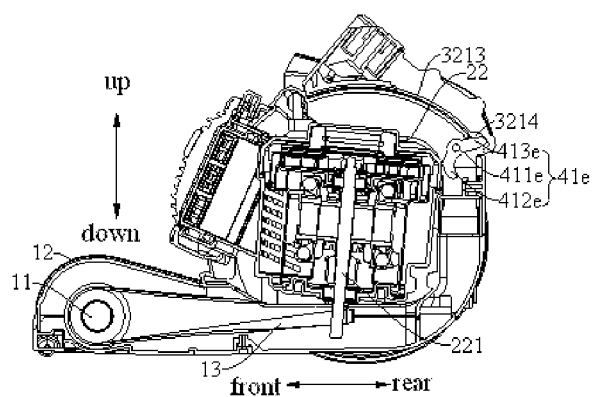
FIG. 48 is a partial view of the upright vacuum cleaner of FIG. 47.
Figure 50:
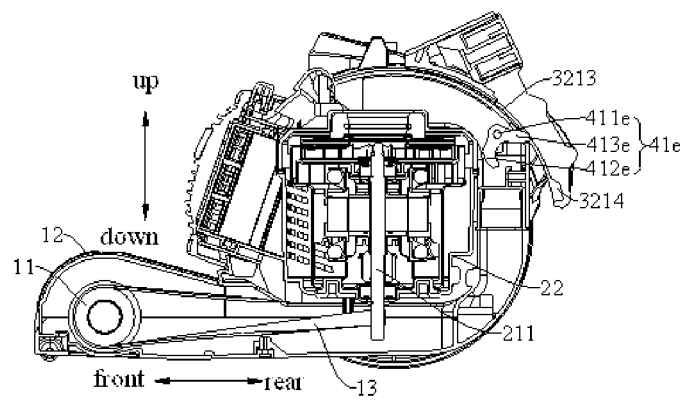
FIG. 50 is a partial view of the upright vacuum cleaner of FIG. 49.

Alternatively, the second end of the lever member 43d is configured as a hook 431d, and an end of the toggling tongue 42d is engaged in the hook 431d. Referring to FIG. 45 and FIG. 46, the first end of the lever member 43d is configured as the hook 431d with an opening facing the toggling tongue 42d. When the body 31 is manipulated from the second upright position to the second oblique position (i.e. inclining backwards as shown in FIG. 45), the second sliding rail 41d on the bridging member 32 rotates clockwise relative to the lever member 43d. Since the second sliding rail 41d keeps cooperation with the second end of the lever member 43d, in this process, the lever member 43d rotates clockwise around the rotational center, and the hook 431d on the lever member 43d is engaged with the toggling tongue 42d to drive the toggling tongue 42d counterclockwise rotating around the pivotal axis and thus to make the motor 22 to rotate from the first oblique state to the first upright state, thereby tensioning the drive belt 13.

Specifically, according to an embodiment of the present disclosure, the toggling tongue 42 includes a rotational part 421d and a tongue part 422d. One of the rotational part 421d and the motor housing 21 is provided with a second rotating shaft 44d, and the other thereof is provided with a second rotational axle hole in cooperation with the second rotating shaft 44d. A first end of the tongue part 422d is connected to the rotational part 421d, while a second end thereof extends along the curve line in a direction away from the rotational part 421d. The second end of the tongue part 422d cooperates with the first end of the lever member 43d.

Referring to FIG. 46, the toggling tongue 42 mainly includes the rotational part 421d and the tongue part 422d. The first end of the tongue part 422d is connected to a side wall of the rotational part 421d, while the second end of the tongue part 422d extends in the direction away from the rotational part 421d. The toggling tongue 42d is fixed on the motor casing 222 of the motor 22. Further, the second rotating shaft 44d is disposed in an inner wall of the motor housing 21 opposite to the motor casing 222; the rotational part 421d is provided with the second rotational axle hole in cooperation with the second rotating shaft 44d. When the motor assembly 200, the body assembly 300 and the lever member 43d are assembled, the free end of the tongue part 422d is engaged in the hook 431d of the lever member 43d. Therefore, due to the cooperation of the hook 431d of the lever member 43d with the tongue part 422d of the toggling tongue 42d, the reliability of connecting the lever member 43d with the toggling tongue 42d may be enhanced to guarantee the stability and reliability of transmitting the motion and power, so as to guarantee the normal working of the clutching device 400.

Preferably, according to an embodiment of the present disclosure, the toggling tongue 42 and the motor casing 222 of the motor 22 are molded integrally. Thus, the structure formed integrally cannot only guarantee the stability of the structure and performance of the upright vacuum cleaner 1, but also save redundant parts and connecting procedures due to simple molding and manufacturing, so as to improve the assembling efficiency of the upright vacuum cleaner 1 considerably and guarantee the reliability of connecting the toggling tongue 42d with the motor casing 222. Moreover, this structure has high overall strength and stability and long service life, and is easy to assemble.

Alternatively, the lever member 43d is rotatably connected to the side wall of the motor housing 21. Referring to FIGS. 17 to 24, the side wall of the motor housing 21 extends along the vertical direction (i.e. the up-and-down direction shown in FIG. 17); the lever member 43d is disposed on the side wall of the motor housing 21 and is rotatable in the vertical side wall surface of the motor housing 21. That is, the rotating axis of the lever member 43d is perpendicular to the vertical plane of the lever member 43d.

Specifically, as shown in FIG. 39, the toggling tongue 42d is fixed on the motor casing 222 of the motor 22. For example, a bracket extending along the vertical direction is disposed on the motor casing 222 of the motor 22, and the toggling tongue 42d is fixed on the bracket. The second rotating shaft 44d for mounting the toggling tongue 42d is disposed on a side of the motor housing 21 opposite to the motor casing 222 of the motor 22. The toggling tongue 42d on the motor casing 222 of the motor 22 is fitted over the second rotating shaft 44d on the motor housing 21 and is rotatable relative to the motor housing 21. That is, the motor 22 may be rotatably connected to the motor housing 21 through the cooperation between the toggling tongue 42d and the second rotating shaft 44d. The second sliding rail 41d is fixed on the side wall of the bridging member 32; the first end of the lever member 43d cooperates with the toggling tongue 42d while the second end thereof cooperates with the second sliding rail 41d.

When the body 31 is manipulated from the second upright position to the second oblique position (i.e. inclining backwards as shown in FIG. 43), the bridging member 32 on the motor housing 21 rotates clockwise relative to the motor housing 21, and hence the second sliding rail 41d on the bridging member 32 rotates clockwise relative to the lever member 43d. Since the second sliding rail 41d keeps cooperation with the second end of the lever member 43d, in this process, the lever member 43d rotates clockwise around its rotational center, which makes it possible that the lever member 43d drives the toggling tongue 42d counterclockwise rotating around a pivotal axis, thereby make the motor 22 to rotate from the first oblique state to the first upright state. In this process, the lower end of the motor shaft 221 moves backwards gradually, which increases the distance between the lower end of the motor shaft 221 and the brushroll 11, so as to tension the drive belt 13.

Advantageously, there are two lever members 43d that are disposed symmetrically at both sides of the motor housing 21. That is, two lever members 43d disposed symmetrically are arranged on the opposite inner walls of the motor housing 21, and each lever member 43d is pivotal in the vertical plane. Two toggling tongues 42d disposed symmetrically are arranged on the motor casing 222 of the motor 22, while two second sliding rails 41d disposed symmetrically are arranged on the bridging member 32. Each lever member 43d cooperates with the toggling tongue 42d and the second sliding rail 41d at the corresponding position so as to realize the rotation of the motor 22 in the motor housing 21.

Of course, the present disclosure is not limited thereby. Two lever members 43d may be rotatably connected on the top wall of the motor housing 21 and may be pivotal in the horizontal plane; two toggling tongues 42d and two second sliding rails 41d keep abutting against and the connection with the lever member 43d at the corresponding position, so as to realize the transmission of motion and power. Therefore, by disposing the clutching device 400 arranged axially symmetrically at two sides of the central line of the motor assembly 200, it is possible to provide the system with sufficient power for driving the motor 22, to reduce the force imposing on the individual lever member 43d to enhance the reliability of using the lever member 43d, and to guarantee the balanced force and the stable structure during the rotation of the motor 22, so as to strengthen the reliability of using the upright vacuum cleaner 1.

Embodiment 5

As shown in FIGS. 47 to 51, the clutching device 400 of the upright vacuum cleaner 1 according to the embodiments of the present disclosure includes a first sliding rail 3213 and a lever rotating member 41e. The first sliding rail 3213 is formed in the bridging member 32 and a tail end of the first sliding rail 3213 has a first sliding rail tail groove 3214 formed by a recess in a surface of the tail end of the first sliding rail 3213; and the lever rotating member 41e is rotatably disposed on the motor housing 21 and two ends of the lever rotating member 41e cooperate with the first sliding rail 3213 and the motor 22 respectively. When the body 31 moves from the second upright position to the second oblique position, a first end of the lever rotating member 41e slides from the first sliding rail tail groove 3214 to the first sliding rail 3213, and a second end of the lever rotating member 41e causes the motor 22 to move from the first oblique position to the first upright position.

Specifically, the motor housing 21 is provided with a mounting part (not shown) for mounting the lever rotating member 41e. The lever rotating member 41e is rotatably mounted on the mounting part of the motor housing 21, in which the first end of the lever rotating member 41e cooperates with the bridging member 32 and the second end thereof cooperates with the motor casing 222 of the motor 22. When the body 31 moves from the second upright position (i.e. the position of the body 31 shown in FIG. 47) to the second oblique position (i.e. the position of the body 31 shown in FIG. 49), the bridging member 32 rotates along with the movement of the body 31. In such a way, the bridging member 32 drives the rotation of the lever rotating member 41e by pushing a first end of the lever rotating member 41e in cooperation with the bridging member 32, and meanwhile, a second end of the lever rotating member 41e in cooperation with the motor casing 222 causes the motor 22 to rotate from the first oblique position (i.e. the position of the motor 22 shown in FIG. 48) to the first upright position (i.e. the position of the motor 22 shown in FIG. 50).

Therefore, in the upright vacuum cleaner 1 according to the embodiments of the present disclosure, the lever rotating member 41e is disposed on the motor housing 21 and two ends of the lever rotating member 41e cooperate with the bridging member 32 and the motor 22, it is achievable to realize the rotation of the motor 22 and adjust the tension degree of the drive belt 13, so as to guarantee the normal working of dust sweep and dust suction. Moreover, the upright vacuum cleaner 1 is easy to assemble and disassemble, and may operate stably and reliably with a high working efficiency. Additionally, the motor 22 of the upright vacuum cleaner 1 is disposed vertically to reduce the occupation space of the upright vacuum cleaner and facilitate diverse arrangements of various parts of the upright vacuum cleaner 1.

Preferably, according to an embodiment of the present disclosure, the first sliding rail 3213 is configured to be an arc sliding rail with the rotating axis of the bridging member 32 as the central axis.

Referring to FIG. 10 to FIG. 12, the motor 22 may be pivotally disposed on the motor housing 21, while the bridging member 32 is erected outside the motor housing 21 and pivotally connected to the motor housing 21. The rotating axis of the motor 22 and that of the bridging member 32 extend along the left-and-right direction. The motor 22 and the bridging member 32 incline forwards or backwards along the front-and-rear direction during rotation. Advantageously, the contour of the inner wall of the bridging member 32 is configured to be an arc shape with the rotating axis of the bridging member 32 as the central axis, while the first sliding rail 3213 of the bridging member 32 is configured to be an arc shape with the rotating axis of the bridging member 32 as the central axis.

When the body 31 moves from the second upright position to the second oblique position, the bridging member 32 rotates along with the movement of the body 31. In such a way, the arc first sliding rail 3213 on the bridging member 32 rotates around the rotating axis of the bridging member 32. In this process, the bridging member 32 drives the rotation of the lever rotating member 41e by pushing a first end of the lever rotating member 41e in cooperation with the bridging member 32, and meanwhile, a second end of the lever rotating member 41e in cooperation with the motor casing 222 causes the motor 22 to rotate from the first oblique position to the first upright position.

Since the first sliding rail 3213 of the bridging member 32 is configured as an arc first sliding rail 3213 with the rotating axis of the bridging member 32 as the central axis, it is possible to drive the rotation of the lever rotating member 41e by utilizing the rotation of the bridging member 32, so as to realize the purpose of pushing the movement of the motor 22. Therefore, the drive belt 13 is tensioned to guarantee the normal working of the upright vacuum cleaner 1.

Preferably, according to an embodiment of the present disclosure, the first sliding rail 3213 and the first sliding rail tail groove 3214 are connected smoothly via a guide surface.

Specifically, when the body 31 is at the second upright position, the motor 22 is at the first oblique position. At this moment, the first end of the lever rotating member 41e is located at the tail of the first sliding rail 3213 of the bridging member 32, i.e. located in the first sliding rail tail groove 3214. When the body 31 moves from the second upright position to the second oblique position, the bridging member 32 rotates clockwise, such that the first end of the lever rotating member 41e slides from the first sliding rail tail groove 3214 to the first sliding rail 3213 to drive the lever rotating member 41e, while the second end of the lever rotating member 41e causes the motor 22 to rotate from the first oblique position to the first upright position.

Consequently, since the first sliding rail 3213 and the first sliding rail tail groove 3214 are connected smoothly via the guide surface, it is possible to guarantee the stable rotation of the lever rotating member 41e to guarantee the stable rotation of the motor 22, and slow down abrasion of the lever rotating member 41e and prolong the service life of the lever rotating member 41e.

Figure 51:
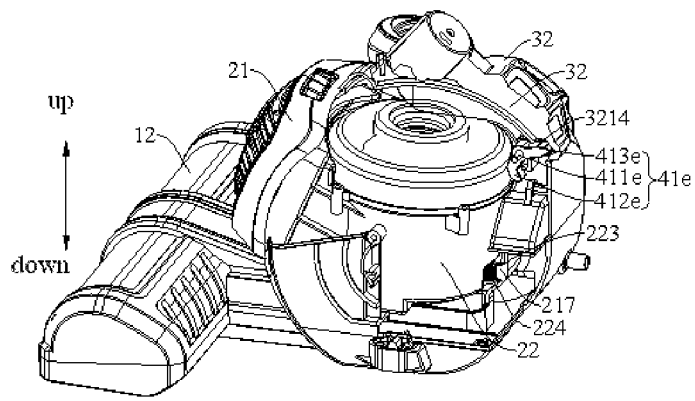
FIG. 51 is an assembly drawing of a brushroll, a motor assembly and a clutching device of the upright vacuum cleaner of FIG. 47.

In some specific embodiments of the present disclosure, the first sliding rail 3213 is formed on the inner top wall of the bridging member 32. Referring to FIG. 51, the inner top wall of the bridging member 32 has the arc first sliding rail 3213 with the rotating axis of the bridging member 32 as the central axis; the arc first sliding rail 3213 extends along the front-and-rear direction. The first sliding rail tail groove 3214 is located at the rear end of the arc first sliding rail 3213, and the lever rotating member 41e is mounted on the motor housing 21 and located behind the motor 22. The first end of the lever rotating member 41e extends beyond the motor housing 21 to realize cooperation with the first sliding rail 3213 of the bridging member 32, and the second end thereof is located behind the motor 22 and cooperates with the motor casing 222 to realize the rotation of the motor 22.

Alternatively, there is one lever rotating member 41e, and is opposite to a top center of a side of the motor 22 away from the brushroll 11. That is, the lever rotating member 41e is located right behind the motor 22; when the bridging member 32 rotates, the lever rotating member 41e may provide sufficient power to make the motor 22 to rotate from the first oblique position to the first upright position.

According to an example of the present disclosure, the lever rotating member 41e includes a rotational mounting part 411e, a third toggling part 412e and a fourth toggling part 413e. The rotational mounting part 411e is rotatably connected to the motor housing 21. The third toggling part 412e and the fourth toggling part 413e are fixed at both sides of the same axial section of the rotational mounting part 411e and extend in a direction away from each other. The third toggling part 412e cooperates with the motor 22, while the fourth toggling part 413e cooperates with the first sliding rail 3213.

In other words, the lever rotating member 41e mainly includes the rotational mounting part 411e, the third toggling part 412e and the fourth toggling part 413e. The third toggling part 412e and the fourth toggling part 413e are connected to two sides of the rotational mounting part 411e respectively. The rotational mounting part 411e is rotatably disposed on the mounting part of the motor housing 21. The third toggling part 412e extends towards the motor 22 and cooperates with the motor casing 222; the fourth toggling part 413e extends beyond the motor housing 21 towards the bridging member 32 to cooperate with the first sliding rail 3213 of the bridging member 32.

When the body 31 moves from the second upright position to the second oblique position, the bridging member 32 rotates along with the movement of the body 31. In such a way, the arc first sliding rail 3213 on the bridging member 32 rotates around the rotating axis of the bridging member 32. In this process, the fourth toggling part 413e slides from the first sliding rail tail groove 3214 to the first sliding rail 3213 to drive the lever rotating member 41e, and meanwhile the third toggling part 412e of the lever rotating member 41e causes the motor 22 to rotate from the first oblique position to the first upright position.

Therefore, the lever rotating member 41e is easy to process, manufacture, assemble and disassemble due to the simple structure. By mounting the lever rotating member 41e on the motor housing 21, it is possible to realize cooperation between the bridging member 32 and the motor 22 to transmit motion and power, so as to guarantee the continuity and stability of the motion.

Preferably, according to an embodiment of the present disclosure, a surface of the fourth toggling part 413e in cooperation with the first sliding rail 3213 is configured as a first smooth curved surface, while a surface of the third toggling part 412e in cooperation with the motor 22 is configured as a second smooth curved surface.

Since the surface of the fourth toggling part 413e in cooperation with the first sliding rail 3213 is configured as the first smooth curved surface, while the surface of the third toggling part 412e in cooperation with the motor 22 is configured as the second smooth curved surface, it is possible to guarantee the continuity and stability of the motion, so as to guarantee the stable rotation of the motor 22, and slow down abrasion of the lever rotating member 41e to prolong the service life of the lever rotating member 41e.

In some specific examples of the present disclosure, the elastic member is disposed between the motor 22 and the motor housing 21. The elastic member is configured to push the motor 22 rotating from the first oblique position to the first upright position when the body 31 moves from the second upright position to the second oblique position.

Therefore, by disposing the elastic member between the motor housing 21 and the motor 22, it is possible to make the motor 22 to rotate from the first oblique position to the first upright position to implement position regulation, and reduce mechanical vibration of the motor 22 during rotation to avoid heavy collision and reduce the noise generated by motion.

Alternatively, the motor 22 includes a first column 223, and the motor housing 21 includes a second column 217; the elastic member is a spring 224 and two ends of the spring 224 are fitted over the first column 223 and the second column 217 to push the motor 22 to the first oblique position.

Referring to FIG. 51, the first column 223 extending backwards is disposed on the outer side wall of the motor 22, and the second column 217 extending forwards is disposed on the inner side wall of the motor housing 21; two ends of the spring 224 are fitted over the first column 223 and the second column 217, which forms a simple structure and is easy to assemble or disassemble, so as to slow down vibration, reduce noise and improve the reliability and quality of the upright vacuum cleaner 1.

The structure and the working process of the upright vacuum cleaner 1 will be described with reference to the accompanying drawings.

Figure 55:
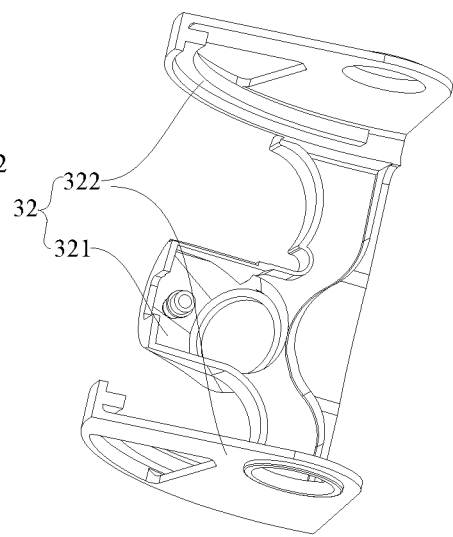
FIG. 55 is a schematic view of a bridging member of an upright vacuum cleaner according to an embodiment of the present disclosure.

As shown in FIGS. 1 to 55, the upright vacuum cleaner mainly includes the brush assembly 100, the motor assembly 200, the body assembly 300, the clutching device 400 and the wheel 38.

Figure 52:
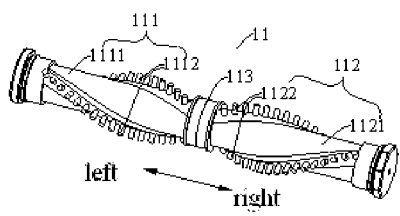
FIG. 52 is a schematic view of a brushroll of an upright vacuum cleaner according to an embodiment of the present disclosure.

The brush assembly 100 includes the brushroll 11 and the brushroll casing 12 that includes an upper casing 124 and a lower casing 125. The brushroll casing 12 defines the drive-belt mounting chamber 123, and the first air-suction channel 1221 and the second air-suction channel 1222 located at both sides of the drive-belt mounting chamber 123. The brushroll 11 is rotatably disposed in the brushroll casing 12, and the drive belt 13 is rotatably disposed within the drive-belt mounting chamber 123. Further, an end of the drive belt 13 is winded upon the middle part of the brushroll 11. Referring to FIG. 52, the brushroll 11 mainly includes the first brushroll section 111, the second brushroll section 112 and the connecting-shaft section 113 disposed coaxially. The first brushroll section 111 and the second brushroll section 112 are connected to two ends of the connecting-shaft section 113 respectively. The first brushroll section 111 includes the first body 1111 and the first bristle 1112 disposed on the first body 1111; the second brushroll section 112 includes the second body 1121 and the second bristle 1122 disposed on the second body 1121. The end of the drive belt 13 is winded upon the connecting-shaft section 113 of the brushroll 11. Further, the tensioning wheel 14 is disposed on the brushroll casing 12 to tension the drive belt 13.

Figure 13:
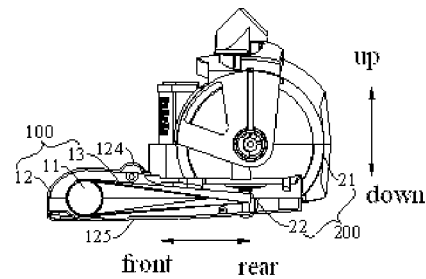
FIG. 13 is a side view of the structure shown in FIG. 10.

The motor assembly 200 includes the motor housing 21, the motor 22 and the fan (not shown). The motor housing 21 defines the motor air-suction channel 216 and the motor air-exhaust channel spaced apart. The motor housing 21 has the dirty air outlet 211 communicated with the motor air-suction channel 216, and the clean air inlet 212 communicated with the motor air-exhaust channel. The motor 22 is disposed upright inside the motor housing 21 and is rotatable with respect to the motor housing 21. That is, the motor shaft 221 of the upright vacuum cleaner 1 is arranged along the vertical direction, and the motor 22 is disposed in rear of the brushroll 11 and connected to the brushroll 11 via the drive belt 13. Specifically, the first end of the drive belt 13 is fitted over the motor shaft 221 of the motor 22 while the second end of the drive belt 13 is fitted over the brushroll 11. When the motor shaft 221 of the motor 22 rotates, the motor shaft 221 drives the rotation of the drive belt 13, and the drive belt 13 drives the brushroll 11 rotating around its own rotating axis, so as to make the motor 22 to drive the rotation of the brushroll 11. Referring to FIG. 13, since the axis of the motor shaft 221 of the motor 22 and that of the brushroll 11 are disposed in the non-parallel manner, the drive belt 13 between the brushroll 11 and the motor shaft 221 is twisted for one time with an angle of 30° to 90°. Further, the motor 22 may drive the rotation of the fan to generate an air flow to provide a vacuuming power; and the motor 22 may drive the rotation of the brushroll 11 around its own axis to realize the purpose of cleaning the ground.

The body assembly 300 includes the body 31, the bridging member 32 and the dirt cup 37, in which the dirt cup 37 and the bridging member 32 are mounted on the body 31 respectively; the bridging member 32 is connected to the lower end of the body 31. Two side plates 322 of the bridging member 32 are disposed outside the side wall of the motor housing 21 respectively and rotatably connected to the motor housing 21. Meanwhile, the rotatable wheel 38 is disposed outside the two side plates 322 of the bridging member 32 to make it easier for the user to push the upright vacuum cleaner 1. The dirt cup 37 defines the separating chamber 371 therein, and includes the air inlet 372 and the air outlet 373 communicated with the separating chamber 371 respectively. The body 31 defines the body air-exhaust channel 311 therein. The air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The dust and debris sucked through the dust suction port of the brushroll casing 12 are delivered into the motor air-suction channel 216 of the motor housing 21 sequentially through the first air-suction channel 1221 and the second air-suction channel 1222, and then into the separating chamber 371 of the dirt cup 37 for filtration. The clean air obtained is discharged to the motor air-exhaust channel of the motor housing 21 from the air outlet 373 of the dirt cup 37, and finally discharged to the outside from the air exhaust hole 213 of the motor housing 21.

The triggering member of the clutching device 400 is rotatably disposed on the motor housing 21, and cooperates with the bridging member 32 and the motor casing 222 of the motor 22, such that the bridging member 32 drives the rotation of the clutching device 400, and the clutching device 400 realizes the rotation of the motor 22.

Referring to FIG. 4, when it is in the non-working state, the upright vacuum cleaner 1 may be placed upright on the ground, i.e. the body 31 being at the second upright position, which occupies small space. If the user needs to use the upright vacuum cleaner 1, the user may hold the handle of the body 31 to push the upright vacuum cleaner 1 to work. First, the user may turn on the switch of the upright vacuum cleaner 1, in which case the drive belt 13 is in the loosening state, and the motor 22 cannot drive the rotation of the brushroll 11. That is, the upright vacuum cleaner 1 is in a stand-by state where the brushroll 11 does not sweep dust. Then, the body 31 is turned manually from the second upright position to the second oblique position, the bridging member 32 on the motor housing 21 rotates clockwise along with the body 31 relative to the motor housing 21, such that the bridging member 32 realizes the rotation of the motor 22 in the motor housing 21 by driving the clutching device on the motor housing 21. That is, the motor 22 rotates from the first oblique position to the first upright position. In this process, the lower end of the motor shaft 221 moves backwards gradually, which increases the distance between the lower end of the motor shaft 221 and the brushroll 11, so as to tension the drive belt 13. The motor 22 may drive the rotation of the brushroll 11 by the drive belt 13 to implement the operations of dust sweep and dust suction. Of course, the present disclosure is not limited thereby. The user may rotate the body 31 from the second upright position to the second oblique position directly, in which process the drive belt 13 is tensioned; and then the switch of the upright vacuum cleaner 1 is turned on to implement the operations of dust sweep and dust suction simultaneously.

That is, the user just needs to turn on the switch to start or stop dust sweep by manipulating the direction of the handle of the body 31, with simple operations instead of operation control keys. Alternatively, the switch may be disposed on the handle of the body 31 to facilitate manual operations, or may be disposed on the brushroll casing 12 or the motor housing 21 below the body 31 to make it convenient to turn on the switch by foot. The motor 22 may be disposed near the ground. That is, the gravity of the motor 22 is lower than that of the motor 22 of the vacuum cleaner in the related art, such that the upright vacuum cleaner 1 having the body 31 of the same length in the present disclosure is easier to operate with less effort.

When the upright vacuum cleaner 1 is in the working state, the dirty air and dust are introduced into the brushroll air-suction channel 122 via the dust suction port of the brushroll casing 12, then into a motor air-suction channel 216 in the motor housing 21, and discharged into the body assembly 300 via the dirty air output pipe 214 on the motor housing 21; clean air obtained by filtration of the body assembly 300 enters the motor air-exhaust channel within the motor housing 21 via the clean air input pipe 215 of the motor housing 21. The air exhaust pipe 39 is disposed between the body 31 and the motor housing 21; two ends of the air exhaust pipe 39 are communicated with the body air-exhaust channel 311 of the body 31 and the clean air inlet 212 of the motor housing 21 respectively. The clean air obtained after filtration and processing of the dirt cup 37 is introduced into the motor air-exhaust channel in the motor housing 21 sequentially through the body air-exhaust channel 311, the air exhaust pipe 39 and the clean air inlet 212, and finally discharged to the outside from the air exhaust hole 213 of the motor housing 21.

It shall be noted that when the body 31 is manipulated from the second upright position to the second oblique position at the predetermined angle, the motor 22 may rotate synchronously along with the body 31. When the body 31 rotates to the predetermined angle, the user may manipulate the body 31 freely without any impact on the tensioned state of the drive belt 13. That is, when the motor 22 rotates from the first oblique position to the first upright position, the body 31 may be manipulated freely without affecting the dust sweep and dust suction of the upright vacuum cleaner 1. Of course, the present disclosure is not limited thereby. The rotation angle of the body 31 may be directly associated with that of the motor 22, i.e. adjusting the position of the motor 22 by adjusting the oblique angle of the body 31 manually so as to adjust the tension degree of the drive belt 13.

The other configurations and operations of the upright vacuum cleaner 1 according to the embodiments of the present disclosure are known to those skilled in the art, which will not be elaborated herein.

Reference throughout this specification to "an embodiment," "some embodiments," "an example," "specific examples" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification.

Although embodiments of the present disclosure have been shown and illustrated, it shall be understood by those skilled in the art that various changes, modifications, alternatives and variants without departing from the principle and spirit of the present disclosure are acceptable. The scope of the present disclosure is defined by the claims or the like.

What is claimed is:

1. An upright vacuum cleaner, comprising:
    a brushroll;
    a motor assembly comprising a motor housing and a motor disposed within the motor housing, wherein a rotating axis of a motor drive shaft and a rotating axis of the brushroll are disposed in a non-parallel manner, and the motor drives the brushroll by a drive belt and is rotatable between a first upright position in which the drive belt is tensioned and a first oblique position in which the drive belt is loosened;
    a body assembly comprising a body, a bridging member mounted on the body and a cyclonic separating device comprising a dirt cup comprising an air inlet and an air outlet, a filter disposed in the dirt cup and comprising a filter inlet and a filter outlet communicating between the filter inlet and the air outlet, and a cyclonic cone assembly comprising a cyclone cylinder and a cyclonic guide, wherein a first end of the cyclone cylinder is connected to the air inlet, and the cyclonic guide cooperates with a second end of the cyclone cylinder and is detachably fitted over the filter to spirally guide dirty air introduced into the cyclone cylinder from the air inlet to the filter inlet, and the bridging member is rotatably connected to the motor housing to make the body rotatable between a second upright position and a second oblique position;
    wherein the bridging member causes the motor to move from the first oblique position to the first upright position when the body moves from the second upright position to the second oblique position.

2. The upright vacuum cleaner according to claim 1, further comprising:
    a clutching device disposed between the bridging member and the motor, wherein the motor is moved from the first oblique position to the first upright position by the bridging member via the clutching device, when the body moves from the second upright position to the second oblique position.

3. The upright vacuum cleaner according to claim 2, wherein the clutching device comprises:
    a first toggling block fixed on the motor;
    a second toggling block disposed on the bridging member; and
    a lever cam member rotatably disposed on the motor housing and defining two ends cooperating with the first toggling block and the second toggling block respectively.

4. The upright vacuum cleaner according to claim 2, wherein the clutching device comprises:
    a first sliding rail disposed on the bridging member;
    a toggling tongue fixed on the motor and rotatable relative to the motor housing; and
    a lever member defining a first end slidably cooperating with the first sliding rail and a second end cooperating with an end of the toggling tongue.

5. The upright vacuum cleaner according to claim 2, wherein the clutching device comprises:
    a slide chute formed on the bridging member;
    a triggering member rotatably supported on the motor housing and defining a first end with a sliding column slidably cooperating with the slide chute and a second end having a toggling rod adapted for prodding the movement of the motor;
    wherein the sliding column slides along the slide chute to make the triggering member rotate when the bridging member drives the movement of the slide chute, and the toggling rod prods the rotation of the motor relative to the motor housing when the triggering member rotates.

6. The upright vacuum cleaner according to claim 2, wherein the clutching device comprises:
    a second sliding rail formed on the bridging member and defining a tail end having a second sliding rail tail groove formed by a recess in a surface of the tail end of the second sliding rail; and
    a lever rotating member rotatably disposed on the motor housing and defining two ends cooperating with the second sliding rail and the motor respectively, wherein when the body moves from the second upright position to the second oblique position, a first end of the lever rotating member slides from the second sliding rail tail groove to the second sliding rail, and the motor is moved from the first oblique position to the first upright position by a second end of the lever rotating member.

7. The upright vacuum cleaner according to claim 6, wherein the second sliding rail is configured as an arc second sliding rail with a rotating axis of the bridging member as a central axis.

8. The upright vacuum cleaner according to claim 1, wherein an elastic member is disposed between the motor and the motor housing and is configured to push the motor moving from the first upright position to the first oblique position when the body moves from the second oblique position to the second upright position.

9. The upright vacuum cleaner according to claim 1, wherein the drive belt is winded upon a central part in a direction of the axis of the brushroll.

10. The upright vacuum cleaner according to claim 1, further comprising:
    a brushroll casing disposed outside the brushroll and comprising a brushroll air-suction channel and a drive-belt mounting chamber for mounting the drive belt, wherein the brushroll air-suction channel comprises a first air-suction channel and a second air-suction channel located at both sides of the drive-belt mounting chamber.

11. The upright vacuum cleaner according to claim 10, wherein the first air-suction channel and the second air-suction channel are disposed symmetrically with respect to the drive belt.

12. The upright vacuum cleaner according to claim 1, further comprising two wheels disposed at two sides of the motor housing respectively and rotatably connected to the motor housing, wherein the bridging member comprises a top plate and two side plates connected at both sides of the top plate, the two side plates being clamped between two side walls of the motor housing and the corresponding wheels respectively and rotatably connected to the motor housing.

13. The upright vacuum cleaner according to claim 12, wherein the top plate of the bridging member is provided with a first connecting pipe that defines a positioning column therein; the body is provided with a second connecting pipe at a lower end thereof; and a baffle is provided with a positioning cartridge that is fitted over the positioning column after the second connecting pipe is inserted into the first connecting pipe.

14. The upright vacuum cleaner according to claim 1, wherein the cyclonic guide comprises a first cylindrical surface and the filter comprises a second cylindrical surface, the cyclonic guide being detachably fitted over and cooperating with the filter by the first cylindrical surface and the second cylindrical surface.

15. The upright vacuum cleaner according to claim 14, wherein the filter is configured as a cylinder with an open end and a closed end; the open end of the filter defines the filter outlet and the filter inlet is formed on a side wall of the filter.

16. The upright vacuum cleaner according to claim 15, wherein the filter comprises a first section and a second section; the first section is configured to be a solid cylinder while the second section is configured to be a hollow cylinder; a first end of the second section is connected to a first end of the first section and a second end of the second section is open to define the filter outlet, and the filter inlet is formed on a side wall of the second section.

17. The upright vacuum cleaner according to claim 16, wherein the filter inlet comprises a plurality of filter pores that are evenly spaced apart and distributed in an axial direction and/or a circumferential direction of the second section.

18. The upright vacuum cleaner according to claim 16, wherein the cyclonic guide comprises:
a sleeve define a portion fitted over the first section; and
a guide plate disposed between the sleeve and the cyclone cylinder to define, along with the sleeve and the cyclone cylinder, a spiral channel for the dirty air to spirally flow from the air inlet to the filter inlet.

19. The upright vacuum cleaner according to claim 1, wherein the cyclone cylinder and the cyclonic guide are fixedly connected to each other.

* * * * *